US012451595B2

(12) United States Patent
Yang et al.

(10) Patent No.: US 12,451,595 B2
(45) Date of Patent: Oct. 21, 2025

(54) RADAR ANTENNA FOR VEHICLE BUMPER FASCIA

(71) Applicant: INTEL CORPORATION, Santa Clara, CA (US)

(72) Inventors: Tae Young Yang, Portland, OR (US); Arnaud Amadjikpe, Beaverton, OR (US); Ofer Markish, Ra'anana (IL); Baruch Schiffmann, Shoham (IL); Hila Hazenshprung, Tirat Yehuda (IL)

(73) Assignee: INTEL CORPORATION, Santa Clara, CA (US)

( * ) Notice: Subject to any disclaimer, the term of this patent is extended or adjusted under 35 U.S.C. 154(b) by 791 days.

(21) Appl. No.: 17/483,370

(22) Filed: Sep. 23, 2021

(65) Prior Publication Data

US 2022/0013885 A1 Jan. 13, 2022

(51) Int. Cl.

*H01Q 1/32* (2006.01)
*B60R 19/48* (2006.01)
*G01S 7/02* (2006.01)
*G01S 13/931* (2020.01)
*H01Q 1/42* (2006.01)
*H01Q 1/52* (2006.01)

(52) U.S. Cl.

CPC ......... *H01Q 1/3233* (2013.01); *B60R 19/483* (2013.01); *G01S 7/027* (2021.05); *H01Q 1/42* (2013.01); *H01Q 1/525* (2013.01); *G01S 2013/93271* (2020.01)

(58) Field of Classification Search

CPC ........ H01Q 1/3233; H01Q 1/42; H01Q 1/421; H01Q 1/525; H01Q 15/248; H01Q 17/007; G01S 7/027; B60R 19/483

See application file for complete search history.

(56) References Cited

U.S. PATENT DOCUMENTS 5,844,523 A * 12/1998 Brennan .............. H01Q 9/0407 343/846
2002/0067305 A1* 6/2002 LeBlanc ................. G01S 13/04 342/198

(Continued)

FOREIGN PATENT DOCUMENTS

IN 201911034133 A * 2/2021

OTHER PUBLICATIONS

Search Report for European Patent Application No. 22191765.1, mailed on Jan. 31, 2023, 9 pages.

Ushemadzoro Chipengo, Peter M. Krenz, Shawn Carpenter, "From Antenna Design to High Fidelity, Full Physics Automotive Radar Sensor Corner Case Simulation", Modelling and Simulation in Engineering, vol. 2018, Article ID 4239725, 19 pages, 2018. https://doi.org/10.1155/2018/4239725.

(Continued)

*Primary Examiner* — William Kelleher
*Assistant Examiner* — Peter Davon Doze
(74) *Attorney, Agent, or Firm* — Shichrur & Co.

(57) ABSTRACT

For example, a system may include a radome to be attached to a vehicle bumper fascia; an antenna array on a Printed Circuit Board (PCB), the antenna array is between the PCB and the radome, the antenna array comprising a Transmit (Tx) antenna configured to transmit Tx radar signals via the radome and the vehicle bumper fascia, and a receive (Rx) antenna configured to receive Rx radar signals based on the Tx radar signals; and an absorbing spacer in a spacer area between the PCB and the radome, the spacer area separating the Tx antenna from the Rx antenna, the absorbing spacer configured to absorb reflected signals formed by reflection of the Tx radar signals from the vehicle bumper fascia.

23 Claims, 29 Drawing Sheets

(56) References Cited

U.S. PATENT DOCUMENTS

| | | | | |
|---|---|---|---|---|
| 2004/0036645 | A1* | 2/2004 | Fujieda | H01Q 1/421<br>342/72 |
| 2012/0105300 | A1* | 5/2012 | Ando | H01Q 1/525<br>343/872 |
| 2015/0349414 | A1* | 12/2015 | Tagi | H01Q 1/422<br>343/872 |
| 2016/0365625 | A1* | 12/2016 | Meyer | H01Q 1/525 |
| 2018/0131099 | A1 | 5/2018 | Geary et al. | |
| 2018/0207900 | A1* | 7/2018 | Kosugi | B60R 19/52 |
| 2018/0224542 | A1 | 8/2018 | Sakurai et al. | |
| 2021/0050673 | A1* | 2/2021 | Ghosh | H05K 1/0237 |
| 2021/0349209 | A1* | 11/2021 | Lee | G01S 13/505 |
| 2023/0279220 | A1* | 9/2023 | Silvi | G01S 7/027<br>252/511 |

OTHER PUBLICATIONS

M. Gottinger et al., "Coherent Automotive Radar Networks: The Next Generation of Radar-Based Imaging and Mapping," in IEEE Journal of Microwaves, vol. 1, No. 1, pp. 149-163, winter 2021, doi: 10.1109/JMW.2020.3034475.

Wolfgang Menzel et al., "Millimeter-Wave Folded Reflector Antennas with High Gain, Low Loss, and Low Profile", University of Ulm, Microwave Techniques, IEEE Antenna's and Propagation Magazine, vol. 44, No. 3, Jun. 2002, pp. 24-29.

Jie Hu et al., "A Review on Metasurface: From Principle to Smart Metadevices", Frontiers in Physics | www.frontiersin.org, Jan. 2021 | vol. 8 | Article 586087, p. 1-20.

* cited by examiner

1200

1710

RADAR ANTENNA FOR VEHICLE BUMPER FASCIA

TECHNICAL FIELD

Aspects described herein generally relate to a radar antenna for a vehicle bumper fascia.

BACKGROUND

Various types of devices and systems, for example, autonomous and/or robotic devices, e.g., autonomous vehicles and robots, may be configured to perceive and navigate through their environment using sensor data of one or more sensor types.

Conventionally, autonomous perception relies heavily on light-based sensors, such as image sensors, e.g., cameras, and/or Light Detection and Ranging (LIDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
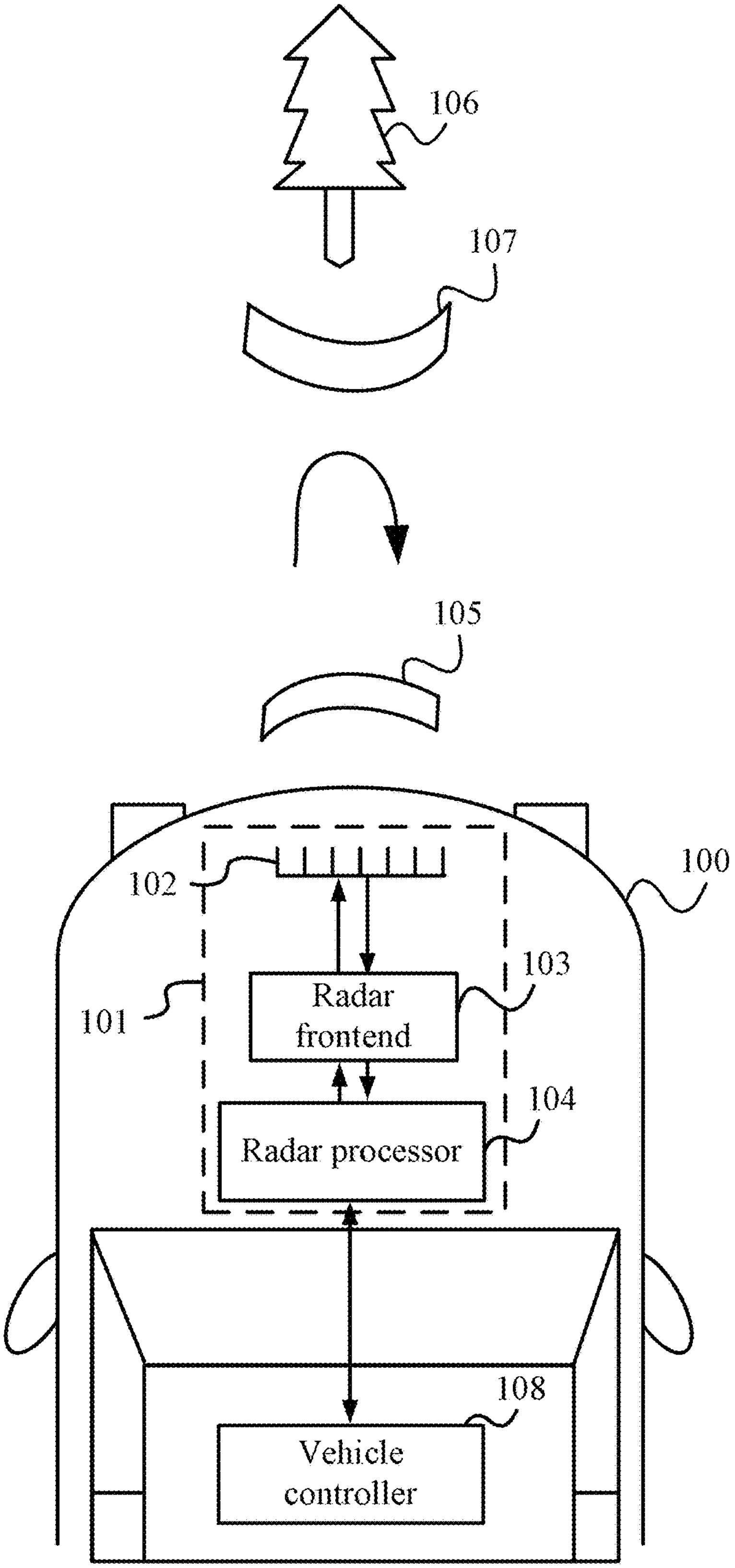
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, “processing”, “computing”, “calculating”, “determining”, “establishing”, “analyzing”, “checking”, or the like, may refer to operation(s) and/or process(es) of a computer, a computing platform, a computing system, or other electronic computing device, that manipulate and/or transform data represented as physical (e.g., electronic) quantities within the computer’s registers and/or memories into other data similarly represented as physical quantities within the computer’s registers and/or memories or other information storage medium that may store instructions to perform operations and/or processes.

The terms “plurality” and “a plurality”, as used herein, include, for example, “multiple” or “two or more”. For example, “a plurality of items” includes two or more items.

The words “exemplary” and “demonstrative” are used herein to mean “serving as an example, instance, demonstration, or illustration”. Any aspect, aspect, or design described herein as “exemplary” or “demonstrative” is not necessarily to be construed as preferred or advantageous over other aspects, aspects, or designs.

References to “one aspect”, “an aspect”, “demonstrative aspect”, “various aspects” “one aspect”, “an aspect”, “demonstrative aspect”, “various aspects” etc., indicate that the aspect(s) and/or aspects so described may include a particular feature, structure, or characteristic, but not every aspect or aspect necessarily includes the particular feature, structure, or characteristic. Further, repeated use of the phrase “in one aspect” or “in one aspect” does not necessarily refer to the same aspect or aspect, although it may.

As used herein, unless otherwise specified the use of the ordinal adjectives “first”, “second”, “third” etc., to describe a common object, merely indicate that different instances of like objects are being referred to, and are not intended to imply that the objects so described must be in a given sequence, either temporally, spatially, in ranking, or in any other manner.

The phrases “at least one” and “one or more” may be understood to include a numerical quantity greater than or equal to one, e.g., one, two, three, four, [ . . . ], etc. The phrase “at least one of” with regard to a group of elements may be used herein to mean at least one element from the group consisting of the elements. For example, the phrase “at least one of” with regard to a group of elements may be used herein to mean one of the listed elements, a plurality of one of the listed elements, a plurality of individual listed elements, or a plurality of a multiple of individual listed elements.

The term “data” as used herein may be understood to include information in any suitable analog or digital form, e.g., provided as a file, a portion of a file, a set of files, a signal or stream, a portion of a signal or stream, a set of signals or streams, and the like. Further, the term “data” may also be used to mean a reference to information, e.g., in form of a pointer. The term “data”, however, is not limited to the aforementioned examples and may take various forms and/or may represent any information as understood in the art.

The terms “processor” or “controller” may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term “memory” is understood as a computer-readable medium (e.g., a non-transitory computer-readable medium) in which data or information can be stored for retrieval. References to “memory” may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term “software” may be used to refer to any type of executable instruction and/or logic, including firmware.

A “vehicle” may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A “ground vehicle” may be understood to include any type of vehicle, which is configured to traverse the ground, e.g., on a street, on a road, on a track, on one or more rails, off-road, or the like.

An “autonomous vehicle” may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input;

and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in SAE J3016 2018*: Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation).

An "assisted vehicle" may describe a vehicle capable of informing a driver or occupant of the vehicle of sensed data or information derived therefrom.

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra-Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a MIMO (Multiple-Input Multiple-Output) array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, an assisted vehicle system, a driver assistance and/or support system, and/or the like.

For example, radar device 101 may be installed in vehicle 100 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below.

In one example, radar device 101 may be mounted onto, placed, e.g., directly, onto, or attached to, vehicle 100.

In some demonstrative aspects, vehicle 100 may include a plurality of radar devices 101. For example, radar device 101 may be implemented by a plurality of radar units, which may be at a plurality of locations, e.g., around vehicle 100. In other aspects, vehicle 100 may include a single radar device 101.

In some demonstrative aspects, vehicle 100 may include a plurality of radar devices 101, which may be configured to cover a field of view of 360 degrees around vehicle 100.

In other aspects, vehicle 100 may include any other suitable count, arrangement, and/or configuration of radar devices and/or units, which may be suitable to cover any other field of view, e.g., a field of view of less than 360 degrees.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer or a circulator, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may be configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
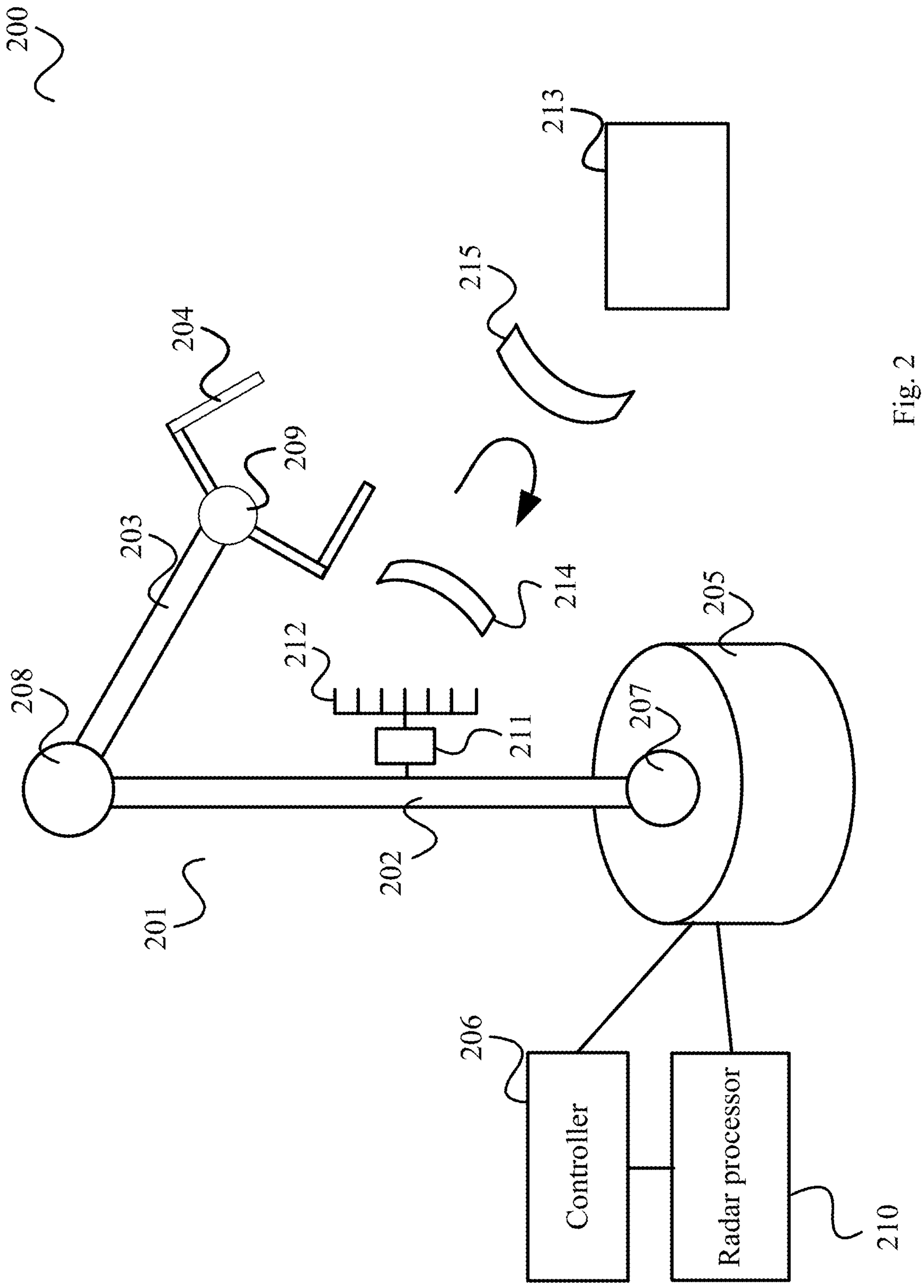
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
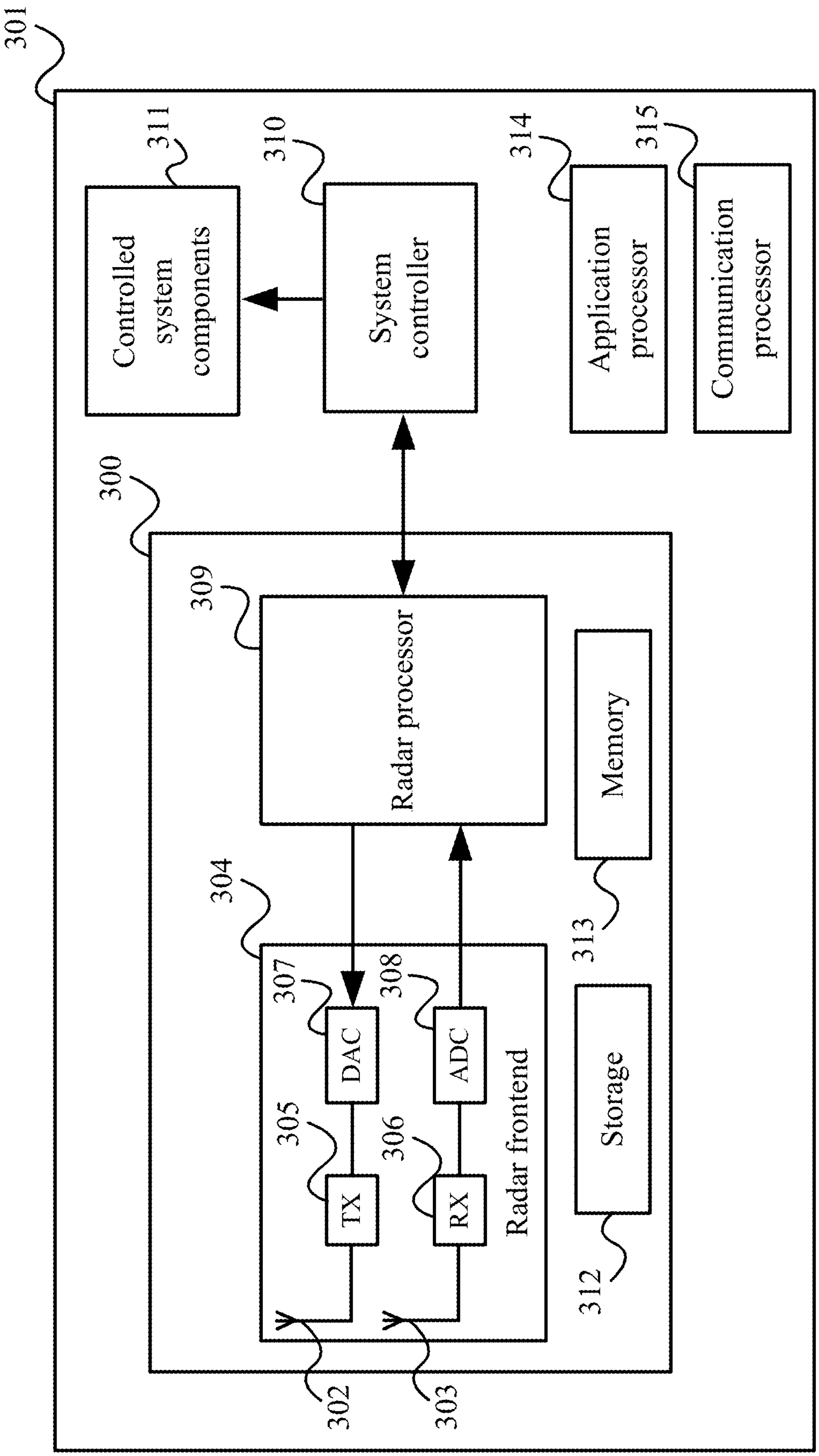
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
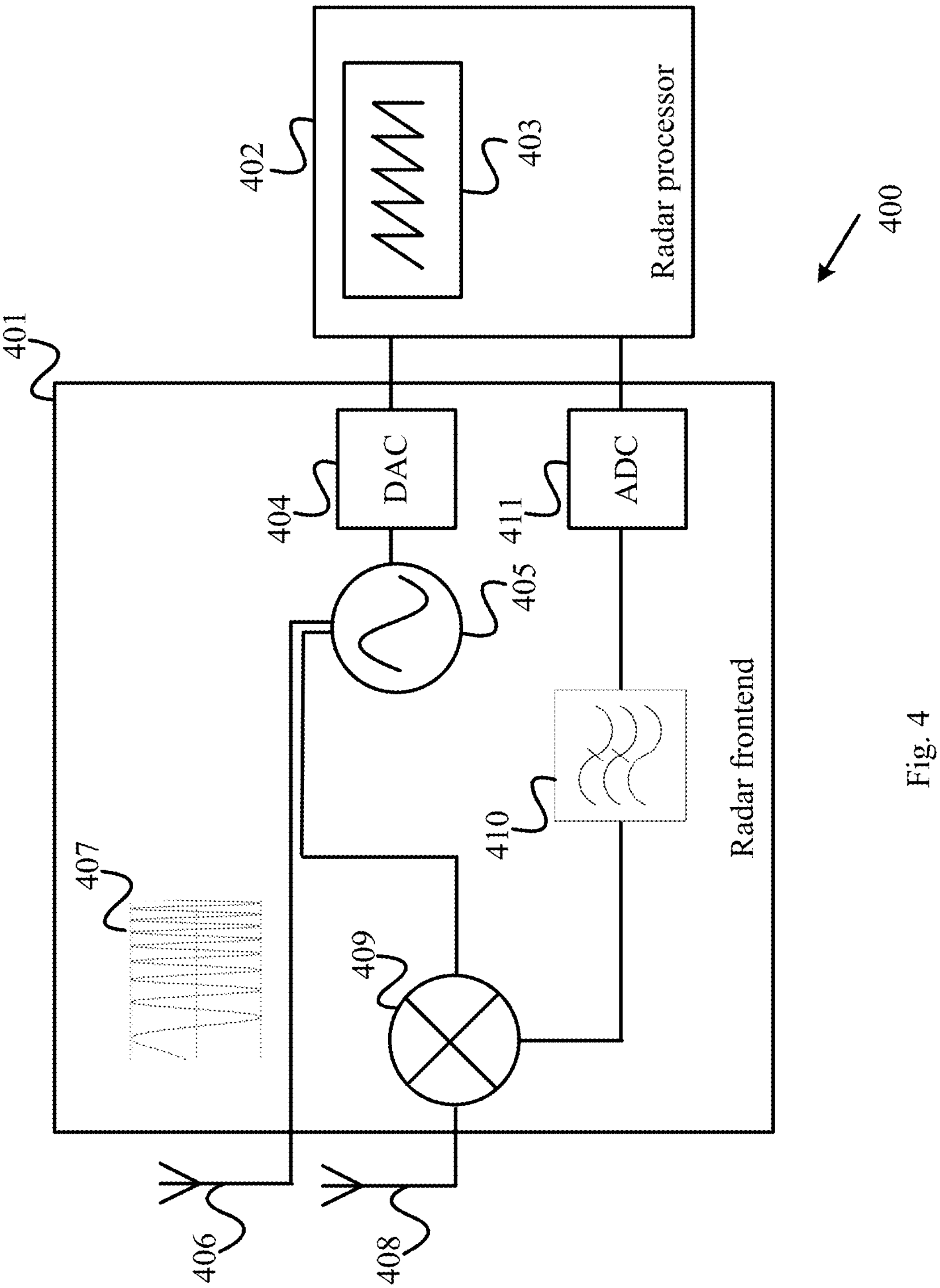
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
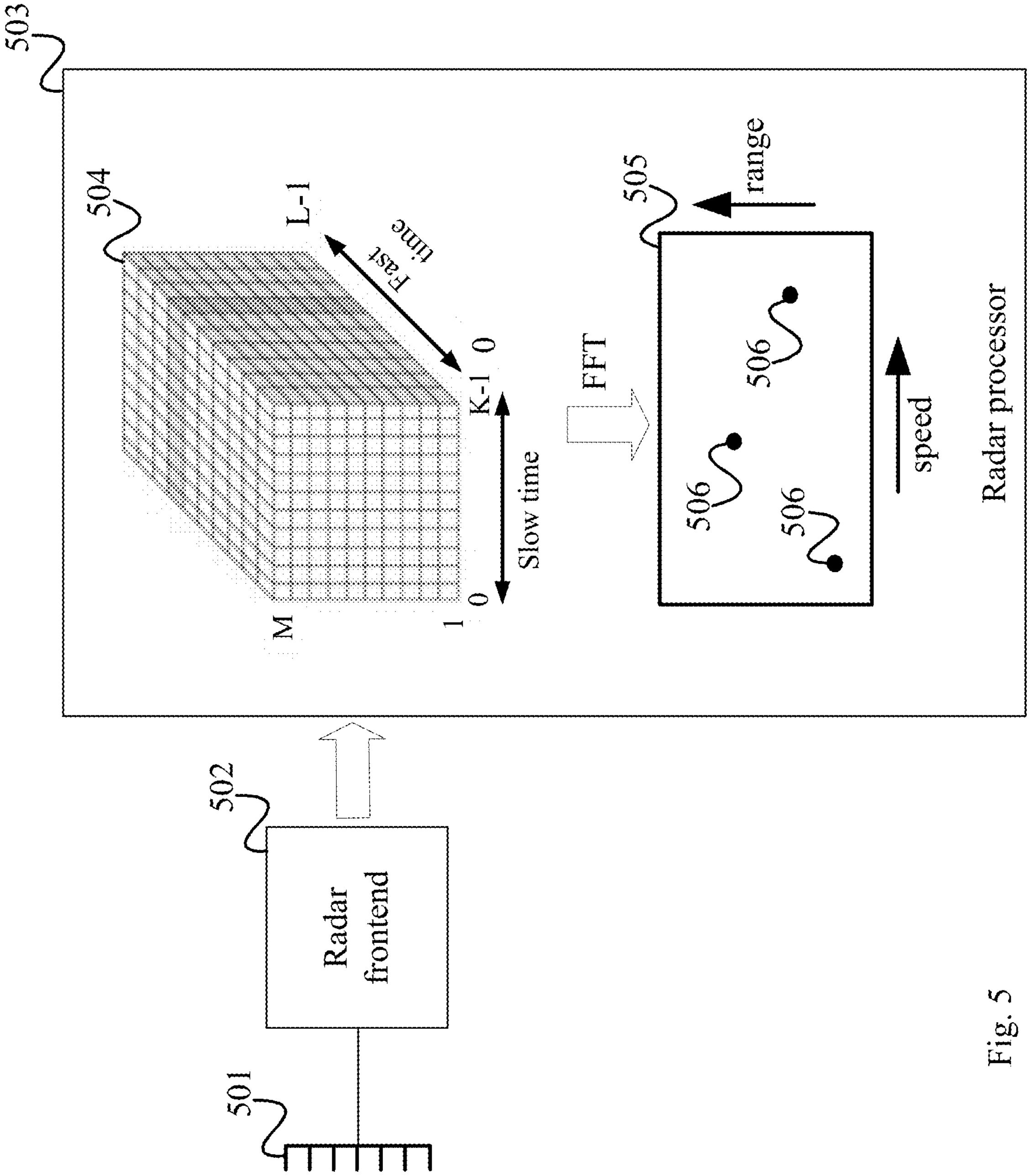
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 107 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
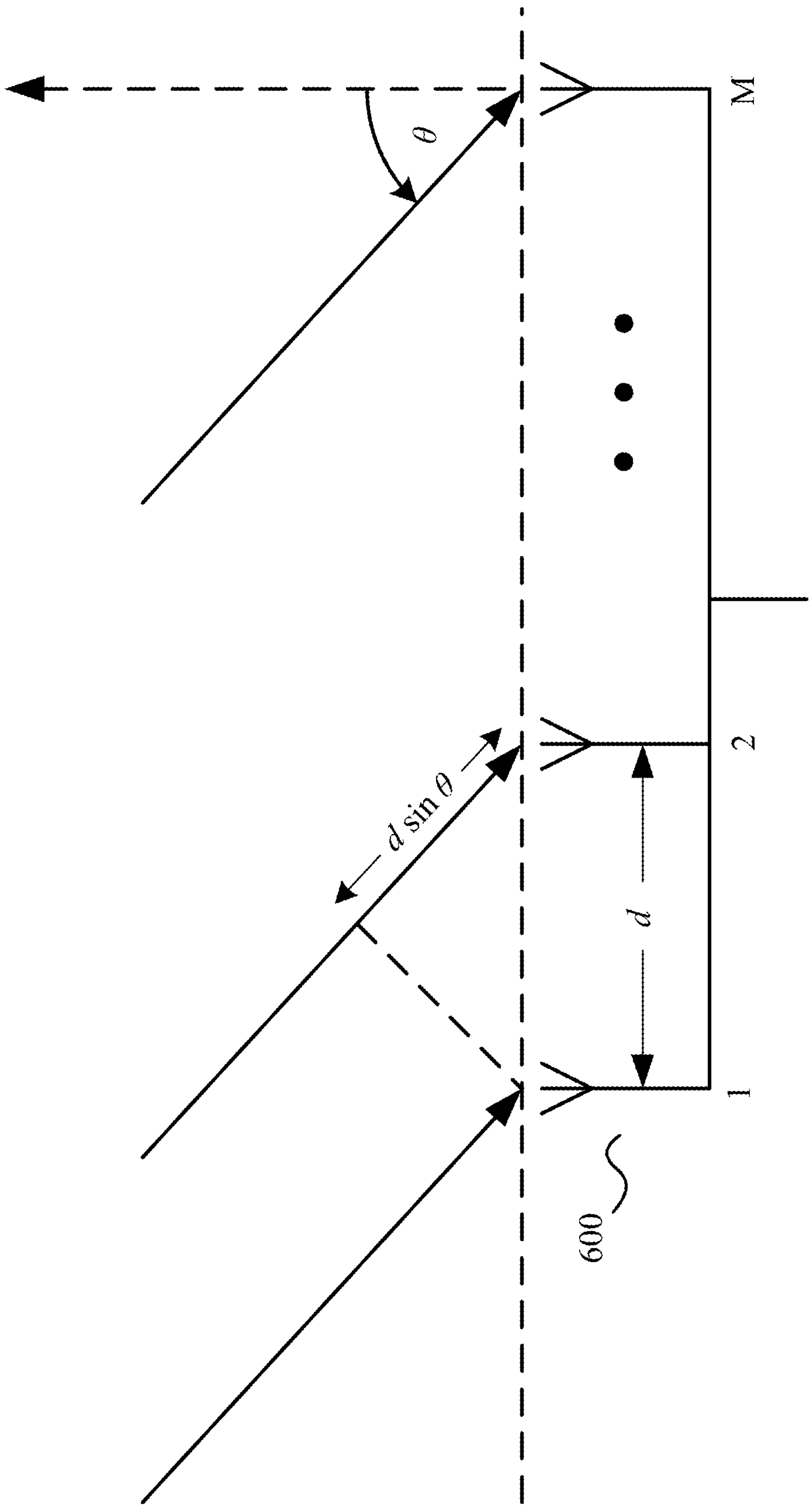
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 600 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
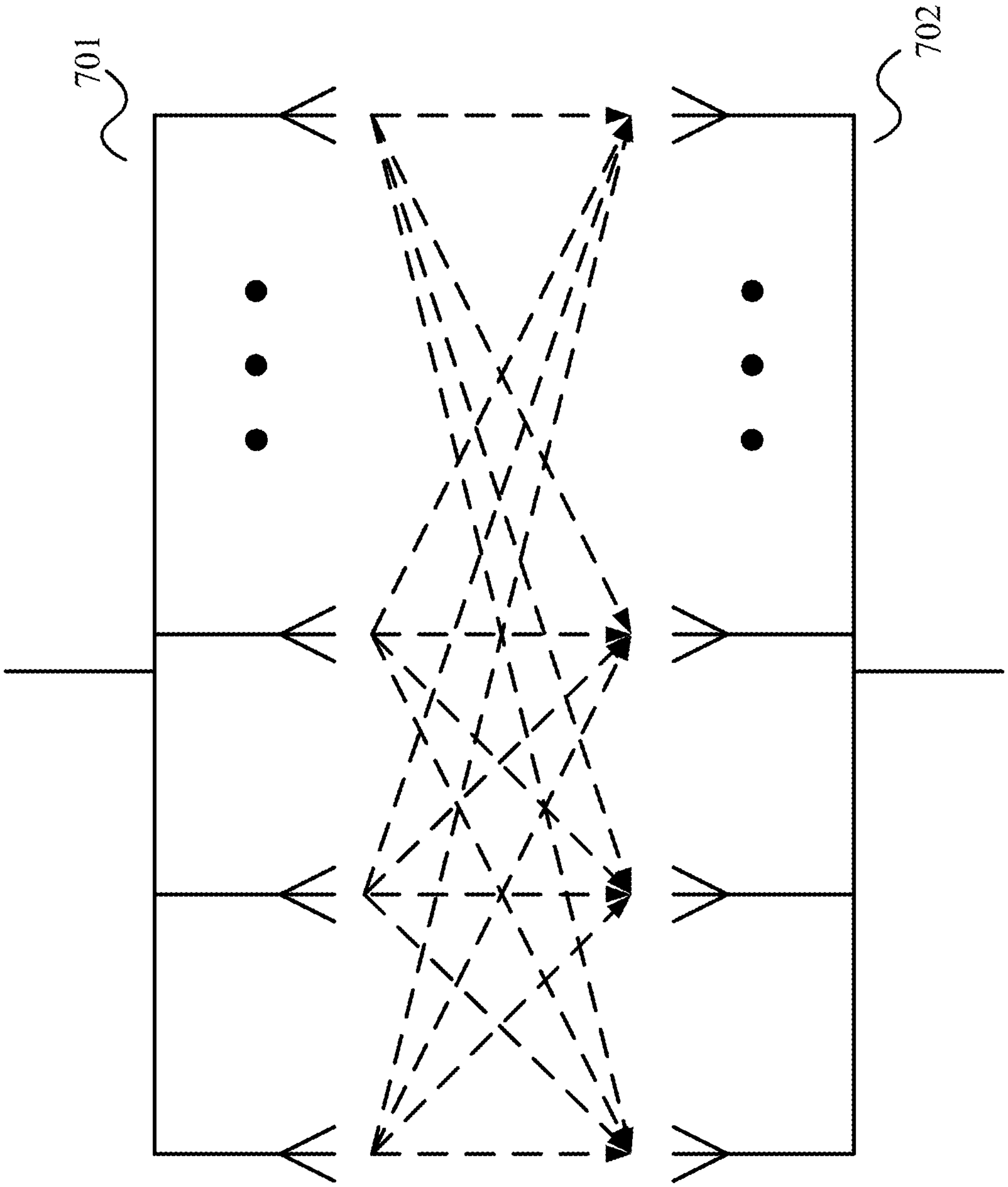
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
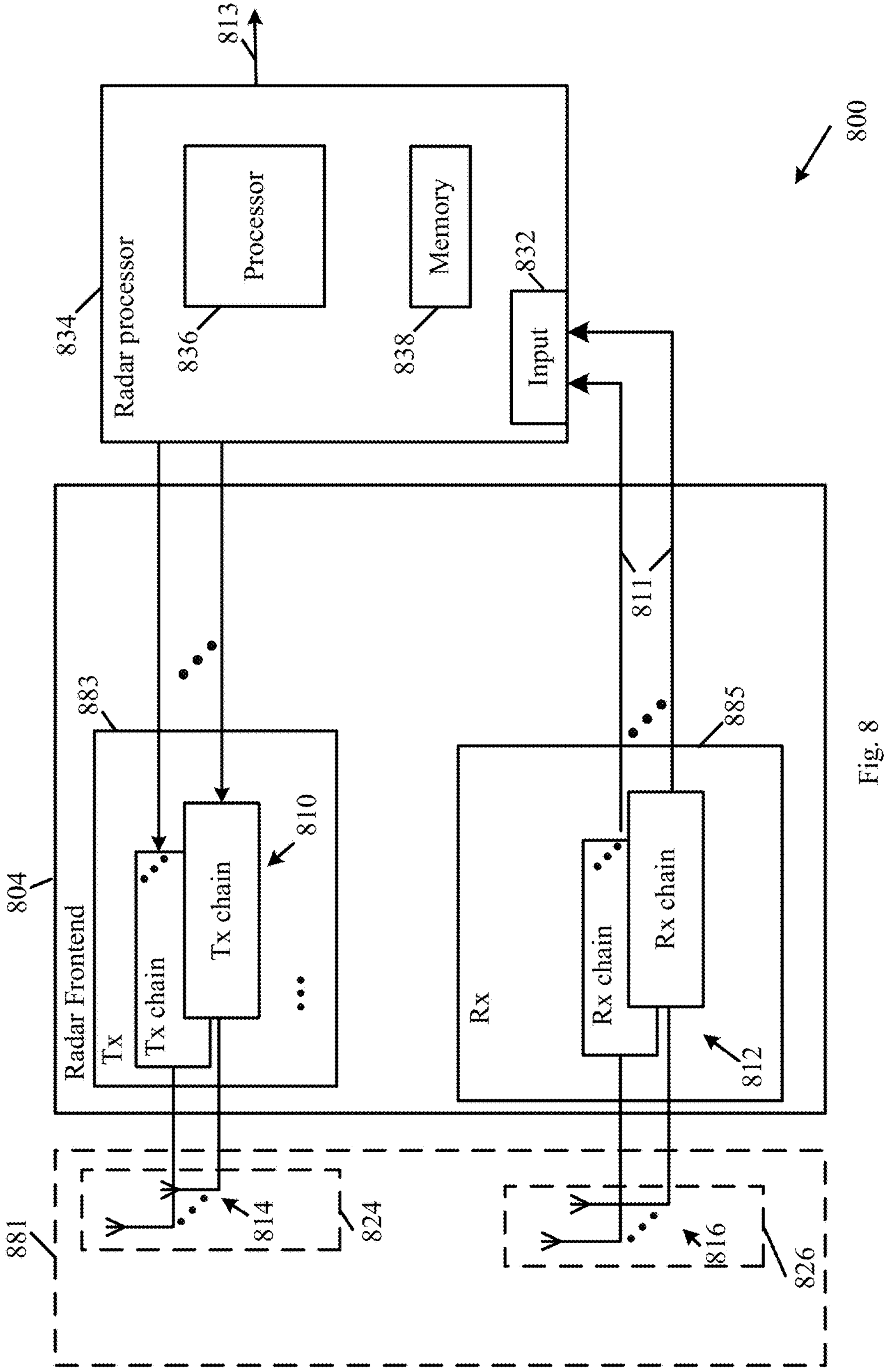
FIG. 8 is a schematic block diagram illustration of elements of a radar device including a radar frontend and a radar processor, in accordance with some demonstrative aspects.

FIG. 8 is a schematic block diagram illustration of elements of a radar device 800, in accordance with some demonstrative aspects. For example, radar device 101 (FIG. 1), radar device 300 (FIG. 3), and/or radar device 400 (FIG. 4), may include one or more elements of radar device 800, and/or may perform one or more operations and/or functionalities of radar device 800.

In some demonstrative aspects, as shown in FIG. 8, radar device 800 may include a radar frontend 804 and a radar processor 834. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data, e.g., as described below. In one example, the range information and/or Doppler information may be determined based on a Cross-Correlation (XCORR) operation, which may be applied to the radar Rx data. Any other additional or alternative operation, algorithm and/or procedure may be utilized to generate the range information and/or Doppler information.

In some demonstrative aspects, memory 838 may be configured to store AoA information, which may be generated by processor 836, for example, based on the radar Rx data, the range information and/or Doppler information, e.g., as described below. In one example, the AoA information may be determined based on an AoA estimation algorithm. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information, e.g., as described below.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via one or more Tx arrays 824 including a plurality of N elements, e.g., Tx antennas 814, and processing received signals via one or more Rx arrays 826 including a plurality of M elements, e.g., Rx antennas 816.

In some demonstrative aspects, utilizing the MIMO technique of transmission of the orthogonal signals from the Tx arrays 824 with N elements and processing the received signals in the Rx arrays 826 with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, a radar system may include a plurality of radar devices 800. For example, vehicle 100 (FIG. 1) may include a plurality of radar devices 800, e.g., as described below.

Figure 9:
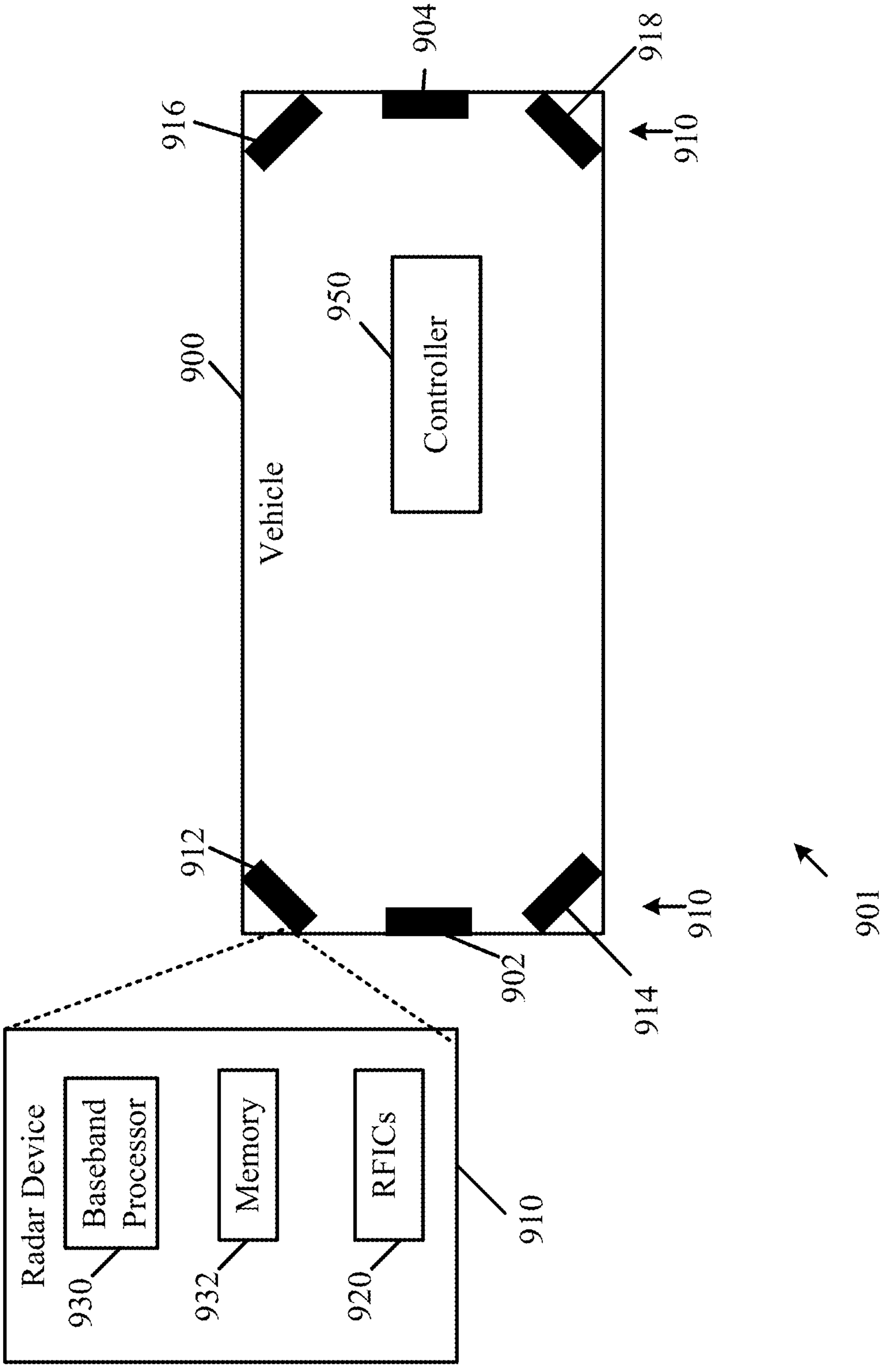
FIG. 9 is a schematic illustration of a radar system including a plurality of radar devices implemented in a vehicle, in accordance with some demonstrative aspects.

Reference is made to FIG. 9, which schematically illustrates a radar system 901 including a plurality of radar devices 910 implemented in a vehicle 900, in accordance with some demonstrative aspects.

In some demonstrative aspects, as shown in FIG. 9, the plurality of radar devices 910 may be located, for example, at a plurality of positions around vehicle 900, for example, to provide radar sensing at a large field of view around vehicle 900, e.g., as described below.

In some demonstrative aspects, as shown in FIG. 9, the plurality of radar devices 910 may include, for example, six radar devices 910, e.g., as described below.

In some demonstrative aspects, the plurality of radar devices 910 may be located, for example, at a plurality of positions around vehicle 900, which may be configured to support 360-degrees radar sensing, e.g., a field of view of 360 degrees surrounding the vehicle 900, e.g., as described below.

In one example, the 360-degrees radar sensing may allow to provide a radar-based view of substantially all surroundings around vehicle 900, e.g., as described below.

In other aspects, the plurality of radar devices 910 may include any other number of radar devices 910, e.g., less than six radar devices or more than six radar devices.

In other aspects, the plurality of radar devices 910 may be positioned at any other locations and/or according to any other arrangement, which may support radar sensing at any other field of view around vehicle 900, e.g., 360-degrees radar sensing or radar sensing of any other field of view.

In some demonstrative aspects, as shown in FIG. 9, vehicle 900 may include a first radar device 902, e.g., a front radar device, at a front-side of vehicle 900.

In some demonstrative aspects, as shown in FIG. 9, vehicle 900 may include a second radar device 904, e.g., a back radar device, at a back-side of vehicle 900.

In some demonstrative aspects, as shown in FIG. 9, vehicle 900 may include one or more of radar devices at one or more respective corners of vehicle 900. For example, vehicle 900 may include a first corner radar device 912 at a first corner of vehicle 900, a second corner radar device 914 at a second corner of vehicle 900, a third corner radar device 916 at a third corner of vehicle 900, and/or a fourth corner radar device 918 at a fourth corner of vehicle 900.

In some demonstrative aspects, vehicle 900 may include one, some, or all, of the plurality of radar devices 910 shown in FIG. 9. For example, vehicle 900 may include the front radar device 902 and/or back radar device 904.

In other aspects, vehicle 900 may include any other additional or alternative radar devices, for example, at any other additional or alternative positions around vehicle 900. In one example, vehicle 900 may include a side radar, e.g., on a side of vehicle 900.

In some demonstrative aspects, as shown in FIG. 9, vehicle 900 may include a radar system controller 950 configured to control one or more, e.g., some or all, of the radar devices 910.

In some demonstrative aspects, at least part of the functionality of radar system controller 950 may be implemented by a dedicated controller, e.g., a dedicated system controller or central controller, which may be separate from the radar devices 910, and may be configured to control some or all of the radar devices 910.

In some demonstrative aspects, at least part of the functionality of radar system controller 950 may be implemented as part of at least one radar device 910.

In some demonstrative aspects, at least part of the functionality of radar system controller 950 may be implemented by a radar processor of at least one of the radar devices 910. For example, radar processor 834 (FIG. 8) may include one or more elements of radar system controller 950, and/or may perform one or more operations and/or functionalities of radar system controller 950.

In some demonstrative aspects, at least part of the functionality of radar system controller 950 may be implemented by a system controller of vehicle 900. For example, vehicle controller 108 (FIG. 1) may include one or more elements of radar system controller 950, and/or may perform one or more operations and/or functionalities of radar system controller 950.

In other aspects, one or more functionalities of system controller 950 may be implemented as part of any other element of vehicle 900.

In some demonstrative aspects, as shown in FIG. 9, a radar device 910 of the plurality of radar devices 910, e.g., each radar device 910, may include a baseband processor 930 (also referred to as a "Baseband Processing Unit (BPU) "), which may be configured to control communication of radar signals by the radar device 910, and/or to process radar signals communicated by the radar device 910. For example, baseband processor 930 may include one or more elements of radar processor 834 (FIG. 8), and/or may perform one or more operations and/or functionalities of radar processor 834 (FIG. 8).

In some demonstrative aspects, baseband processor 930 may include one or more components and/or elements configured for digital processing of radar signals communicated by the radar device 910, e.g., as described below.

In some demonstrative aspects, baseband processor 930 may include one or more FFT engines, matrix multiplication engines, DSP processors, and/or any other additional or alternative baseband, e.g., digital, processing components.

In some demonstrative aspects, as shown in FIG. 9, radar device 910 may include a memory 932, which may be configured to store data processed by, and/or to be processed by, baseband processor 910. For example, memory 932 may include one or more elements of memory 838 (FIG. 8), and/or may perform one or more operations and/or functionalities of memory 838 (FIG. 8).

In some demonstrative aspects, memory 932 may include an internal memory, and/or an interface to one or more external memories, e.g., an external Double Data Rate (DDR) memory, and/or any other type of memory.

In some demonstrative aspects, as shown in FIG. 9, radar device 910 may include one or more RF units, e.g., in the form of one or more RF Integrated Chips (RFICs) 920, which may be configured to communicate radar signals, e.g., as described below.

For example, an RFIC 920 may include one or more elements of front-end 804 (FIG. 8), and/or may perform one or more operations and/or functionalities of front-end 804 (FIG. 8).

In some demonstrative aspects, the plurality of RFICs 920 may be operable to form a radar antenna array including one or more Tx antenna arrays and one or more Rx antenna arrays.

For example, the plurality of RFICs 920 may be operable to form MIMO radar antenna 881 (FIG. 8) including Tx arrays 824 (FIG. 8), and/or Rx arrays 826 (FIG. 8).

In some demonstrative aspects, there may be a need to address one or more technical issues, for example, when implementing a radar system, e.g., a radar system in a vehicle, including a plurality of radar devices, for example, the plurality of radar devices 910, e.g., as described below.

In some demonstrative aspects, vehicle 900 may be equipped with a plurality of sensors to support one or more capabilities, e.g., based on sensor-fusion. In one example, sensor-fusion of a plurality of sensors may support advance driver assistance system (ADAS) capabilities, full autonomous driving capabilities, assisted vehicle capabilities, and/or any other capabilities. For example, radar system 901 may be implemented in vehicle 900 together with one or more other types of sensors, for example, LIDAR sensors, camera sensors, and/or any other sensors. In other aspects, a vehicle may implement radar system 901 with only some, or even without, the other sensors.

In some demonstrative aspects, radar system 901 may be implemented in vehicle 900 to provide a technical solution to improve a reliability of an ADAS, or any other autonomous and/or assisted vehicle system.

In some demonstrative aspects, the reliability of the ADAS or any other autonomous and/or assisted vehicle system may be improved, for example, by configuring radar system 901 to support the ADAS and/or the other autonomous and/or assisted vehicle capabilities, e.g., by itself.

In one example, radar system 901 may be an indispensable sensor for the ADAS and/or other autonomous and/or assisted vehicle capabilities, for example, as radars may not be impacted under various weather conditions, e.g., in opposed to the LIDAR sensors and/or the camera sensors.

In some demonstrative aspects, elements of one or more radar devices 910 may be installed in a hidden manner, for example, behind a vehicle bumper fascia of vehicle 900, example, e.g., for aesthetic reasons.

In some demonstrative aspects, there may be a need to provide a technical solution, which may support installation of antennas of one or more radar devices 910, for example, behind a vehicle bumper fascia, for example, in a manner which may not require using cut-out windows in the vehicle bumper fascia, e.g., as described below In one example, there may be a need to address a technical issue of an interaction between a radar antenna, e.g., radar antenna 881 (FIG. 8), and a vehicle bumper fascia without cut-out windows, for example, to provide a technical solution to avoid or reduce a pattern distortion, e.g., a catastrophic pattern distortion, of a radiation pattern of the radar antenna, e.g., as described below.

Figure 10:
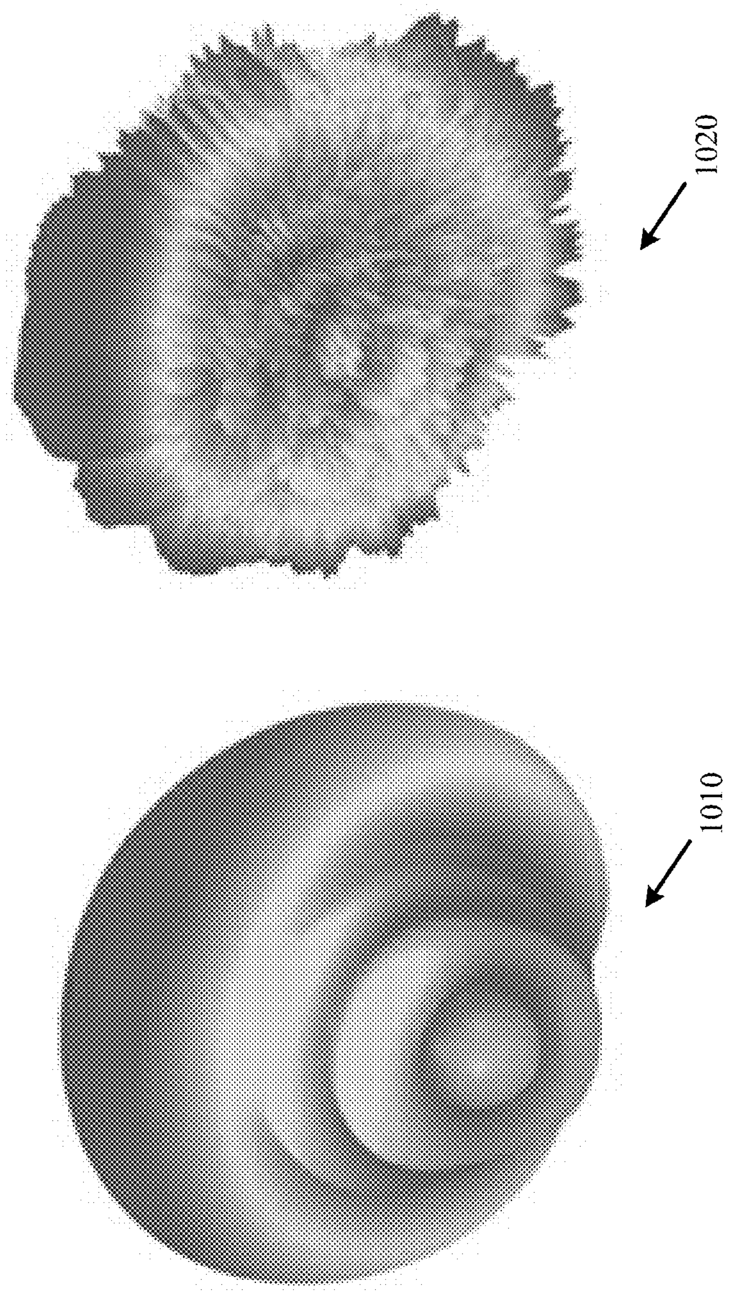
FIG. 10 is a schematic illustration of radiation patterns of a radar antenna, to demonstrate a technical problem, which may be addressed, in accordance with some demonstrative aspects.

Reference is made to FIG. 10, which schematically illustrates radiation patterns of a radar antenna, to demonstrate a technical problem, which may be addressed, in accordance with some demonstrative aspects.

As shown in FIG. 10, a first radiation pattern 1010 may demonstrate a radiation pattern of the radar antenna in free space, e.g., without interaction with a vehicle bumper fascia.

As shown in FIG. 10, a second radiation pattern 1020 may demonstrate a distorted radiation pattern, for example, as a result of interaction between the radar antenna and a vehicle bumper fascia without cut-out windows.

In some demonstrative aspects, the distorted radiation patter 1020 may result from distortion of the radiation pattern 1010 by one or more layers of material of the vehicle bumper fascia. For example, the vehicle bumper fascia may cause reflections of radar signals from the radar antenna, e.g., as described below.

In one example, a catastrophic radiation pattern distortion, e.g., distorted radiation pattern 1020 (FIG. 10), may lead to target-scan blindness at one or more angles. For example, these “blind” angles may be hard to predict, for example, as these angles may depend on electrical properties of each bumper-fascia layer, which may not always be known.

Figure 11:
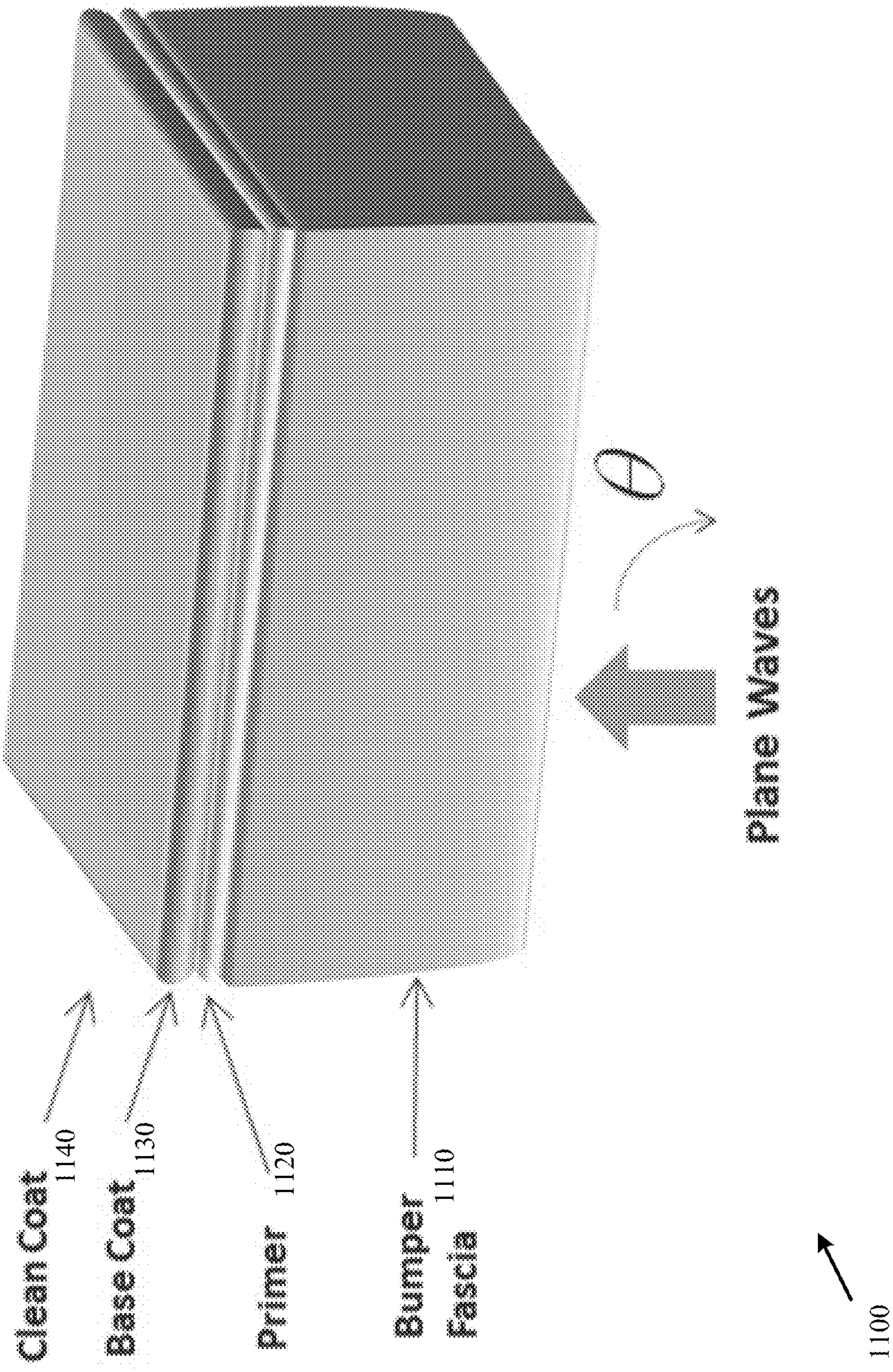
FIG. 11 is a schematic side-view illustration of a plurality of layers of a vehicle bumper fascia, which may be implemented in accordance with some demonstrative aspects.

Reference is made to FIG. 11, which schematically illustrates a side view of a plurality of layers of a vehicle bumper fascia 1100, which may be implemented in accordance with some demonstrative aspects.

In some demonstrative aspects, as shown in FIG. 11, the vehicle bumper fascia 1100 may include a bumper fascia layer 1110.

In some demonstrative aspects, as shown in FIG. 11, the bumper fascia layer 1110 may be coated with a primer layer 1120, a base coat layer 1130, and/or a clean coat layer 1140.

In other aspects, the vehicle bumper fascia 1100 may include any other additional and/or alternative layers.

In some demonstrative aspects, the plurality of layers may have one or more different attributes, e.g., a dielectric constant, denoted $\varepsilon_r$, a loss tangent, denoted tan δ, and/or a thickness, denoted Thickness, e.g., as follows:

TABLE 1

| | $\varepsilon_r$ | tanδ | Thickness |
|---|---|---|---|
| Clean Coat | 3.50 | 0 | 40 micrometer (μm) |
| Base Coat | 40.16 | 0 | 15 μm |
| Primer | 2.81 | 0.0085 | 4 μm |
| Bumper Fascia | 2.90 | 0.0170 | 3416 μm |

In other aspects, the plurality of layers may have any other attributes, and/or may include any other additional and/or alternative layers.

For example, a layer of the plurality of layers of vehicle bumper fascia 1100 may reflect radar signals from a radar antenna, e.g., places behind the vehicle bumper fascia 1100. For example, base coat layer 1120, which may be configured to provide an attractive, cool metallic look to an outer surface of the vehicle, may include metal pigments, which may result in a high dielectric constant, e.g., ($\varepsilon_r$>40), although the base coat layer 1120 may be relatively thin, e.g., (Thickness <20 μm).

For example, base coat layer 1120 may be a major source of angle-dependent reflections and/or frequency detuning of radar signals, for example, due to the high dielectric constant of base coat layer 1120, e.g., as described below.

Figure 12:
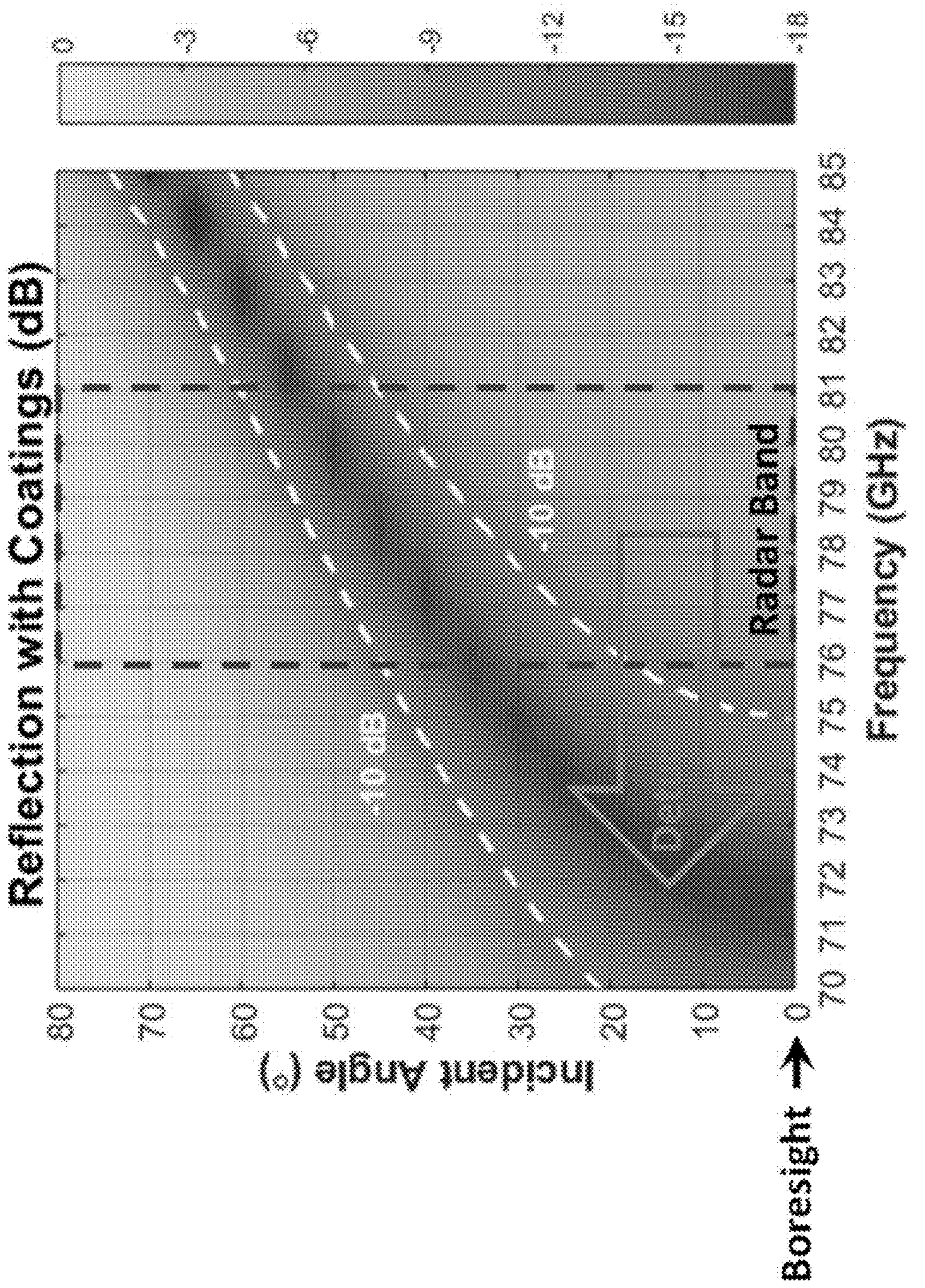
FIG. 12 is a schematic illustration of a graph depicting reflection levels as a function of frequencies and incident angles, to demonstrate a technical problem, which may be addressed, in accordance with some demonstrative aspects.

Reference is made to FIG. 12, which schematically illustrates a graph 1200 depicting simulated reflection levels as a function of frequencies and incident angles, to demonstrate a technical problem, which may be addressed, in accordance with some demonstrative aspects.

In one example, graph 1200 demonstrates a plane-wave analysis of reflections of radar signals of a radar antenna, for example, when interacting with a vehicle bumper fascia, e.g., vehicle bumper fascia 1100 (FIG. 11).

As shown in FIG. 12, the reflection level of the radar signals, e.g., in frequency bands corresponding to the radar frequency band, may be relatively high. These significant reflections may significantly distort Tx and/or Rx antenna radiation patterns, e.g., resulting in the distorted radiation pattern 1020 (FIG. 10).

Referring back to FIG. 9, in some demonstrative aspects, there may be a need to provide a technical solution, which may allow to install one or more radar devices 910, for example, behind a vehicle bumper fascia, e.g., without using cut-out windows, for example, while voiding or mitigating degradation in isolation between the Tx and Rx antenna arrays, e.g., as described below.

In one example, interaction between a radar antenna, e.g., radar antenna 881 (FIG. 8), and a vehicle bumper fascia without cut-out windows may result in degradation of an isolation between the Tx and Rx antenna arrays of the radar antenna, e.g., between Tx arrays 824 (FIG. 8) and Rx arrays 826 (FIG. 8).

In some demonstrative aspects, there may be a need to provide a technical solution to maintain a suitable isolation level, e.g., an isolation level of more than 60 dB or any other isolation level, between Tx antenna elements and Rx antenna elements, for example, when implementing a high-resolution MIMO radar antenna including many antenna elements, e.g., MIMO radar antenna 881 (FIG. 8). In one example, a relatively high isolation level of at least 60 dB may be implemented, for example, to enable long-range target detection, e.g., a target detection range greater than 150 m.

In another example, interaction between a radar antenna, e.g., radar antenna 881 (FIG. 8), and a vehicle bumper fascia without cut-out windows, may result in interference signals, e.g., direct and/or reflected interference signals, between the Tx and Rx antennas of the radar antenna, e.g., between Tx arrays 824 (FIG. 8) and Rx arrays 826 (FIG. 8).

In some demonstrative aspects, the direct and/or reflected interference signals may degrade the isolation between the Tx and Rx antenna arrays of the radar antenna, e.g., as described below.

In one example, a spacing distance between the Tx and Rx antennas may be limited, for example, by an overall xy-dimension of a radar board. Accordingly, in many implementations it may not be efficient or possible to mitigate the interference using a large spacing between the Tx and Rx antennas.

Figure 13:
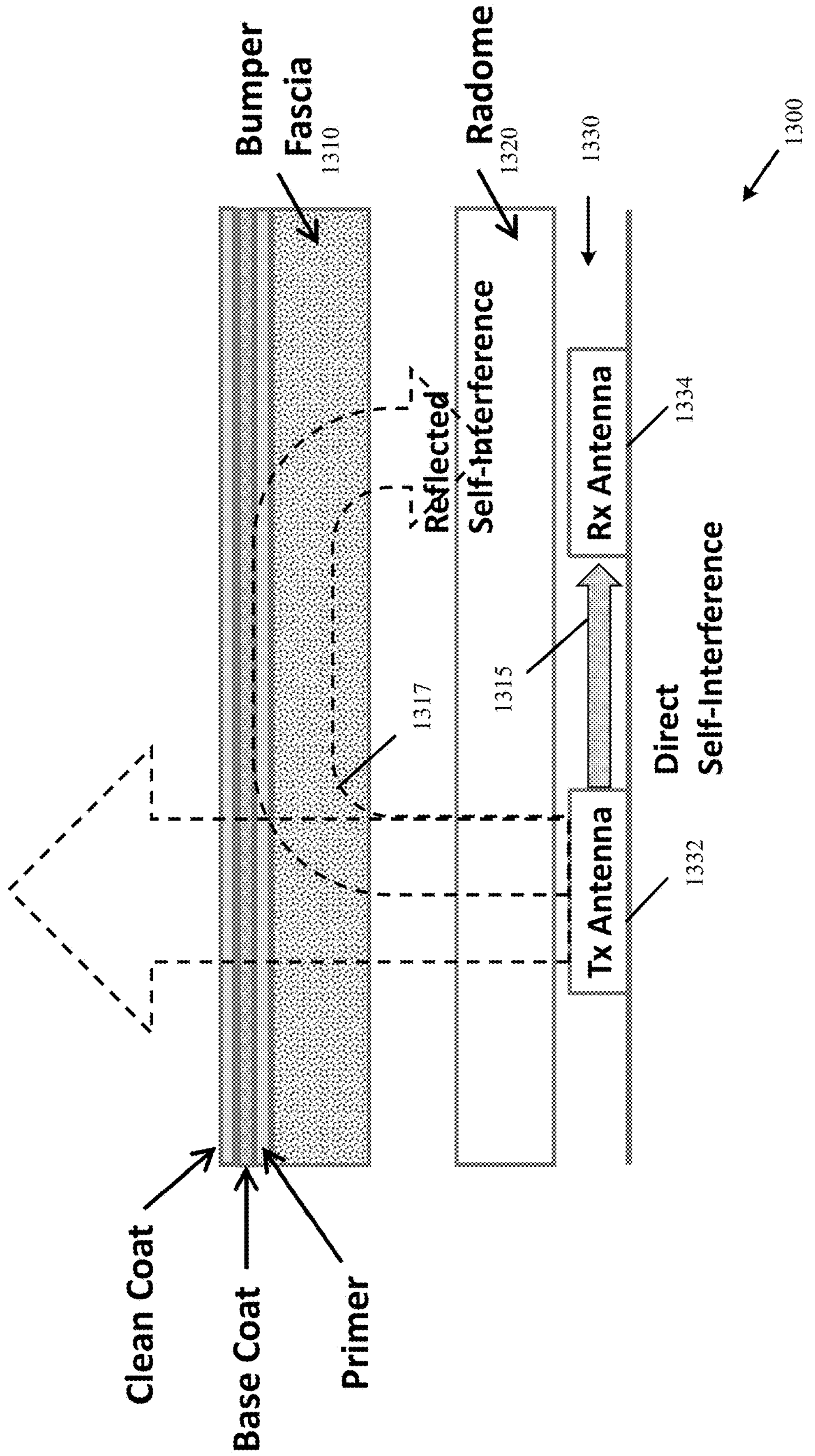
FIG. 13 is a schematic illustration of a system to demonstrate a technical problem, which may be addressed, in accordance with some demonstrative aspects.

Reference is made to FIG. 13, which schematically illustrates a system 1300, to demonstrate a technical problem, which may be addressed, in accordance with some demonstrative aspects.

As shown in FIG. 13, system 1300 may include a vehicle bumper fascia 1310, and a radar antenna 1330, e.g., including a Tx antenna 1332 and an Rx antenna 1334.

In some demonstrative aspects, as shown in FIG. 13, the bumper fascia 1310 may be coated with one or more coats, e.g., a primer coat, a base coat, a clean coat, and/or any other additional or alternative coat.

In other aspects, bumper fascia 1310 may be configured to serve as the radome, e.g., at least part of radome 1320 may be omitted from system 1300.

As shown in FIG. 13, direct interference (“direct self-interference”) signals 1315 may include signals transmitted from a Tx antenna 1332 and received directly by an Rx antenna 1334 of radar antenna 1330, e.g., without being reflected by vehicle bumper fascia 1310.

As shown in FIG. 13, reflected interference ("reflected self-interference") signals 1317 may include signals transmitted from a Tx antenna 1332 and reflected by vehicle bumper fascia 1310 towards the Rx antenna 1334 of the radar antenna 1330.

For example, the reflected interference signals 1317 may be caused by any structures of radar system 1300, including radome 1320, bumper fascia 1310, primer coat, base coat, clean coat. For example, the reflected interference signals 1317 may arrive at Rx antenna 1334 from single or multiple reflections involving one or more structures of radar system 1300.

Some or all of the various implementations described with respect to FIG. 13, may apply to other systems described below, e.g., with respect to FIG. 14, FIG. 16A, FIG. 16B, FIG. 21, FIG. 22, FIG. 23, FIG. 24, FIG. 25, FIG. 26, and/or FIG. 27.

In some demonstrative aspects, the direct interference signals 1315 and/or the reflected interference signals 1317 may limit an isolation performance of the radar antenna 1330.

One possible solution to avoid the reflected interference signals 1317 may include installing antennas of a radar device behind a bumper-fascia grille or a vehicle logo structure. However, in some use cases, scenarios, and/or implementations, this solution may not be sufficient.

For example, placing a radar device behind the bumper-fascia grille or the vehicle logo structure may be suitable for a radar system using a single radar which may support limited functionality, for example, an adaptive cruise control (ACC) functionality, or the like. However, this approach may not be applicable for placing several radar devices, e.g., radar devices 902, 912 and/or 914 (FIG. 9), which may be implemented, for example, to support a wider range of capabilities, for example, partial or full autonomous driving capabilities. For example, the approach of placing the radar device behind the bumper-fascia grille or the vehicle logo structure may not support additional ADAS capabilities, which may require more than a single radar device. For example, this approach may not be sufficient to support implementation of capabilities such as, lane change assist, blind spot monitoring, rear cross traffic alert, and/or the like.

For example, the approach of placing the radar device behind the bumper-fascia grille or the vehicle logo structure may not be sufficient to support a solution using several radar devices, which may be spatially located around a vehicle, for example, to increase reliability of full autonomous driving capabilities, and/or to offer various ADAS functions through a sensor fusion technology, e.g., along with the LIDAR sensors and/or camera sensors.

Another possible solution to avoid the reflected interference signals 1317 may include installing antennas of a radar device in one or more cut-out windows, which may be formed in the vehicle bumper fascia. However, in some use cases, scenarios, and/or implementations, this solution may have one or more disadvantages, inefficiencies, and/or technical problems.

For example, the cut-out windows may not be aesthetic. In one example, a high-resolution MIMO radar may have a size larger than 10×15 $cm^2$, which may be relatively large, for example, compared to a simple radar, e.g., an ACC radar. According to this example, implementing the cut-out windows may result in the vehicle looking like it has multiple big "patches" on a finished surface of the bumper fascia, for example, when several radar devices are placed in several cut-out windows around the vehicle. In one example, this vehicle "look", e.g., including the big "patches", may not be appreciated by vehicle manufacturers, for example, for high-end vehicles or even regular cars, as it may have a significant impact on aesthetic aspects of the car.

In some demonstrative aspects, vehicle 900 may include a fascia-antenna structure including a vehicle bumper fascia, a radome attached to the vehicle bumper fascia, and an antenna array, e.g., of a radar device 910, which may be covered by the radome, e.g., as described below.

In some demonstrative aspects, the fascia-antenna structure may be configured to reduce and/or mitigate direct interference signals and/or reflected interference signals of the antenna array, for example, the direct interference signals 1315 and/or the reflected interference signals 1317, e.g., as described below.

Figure 14:
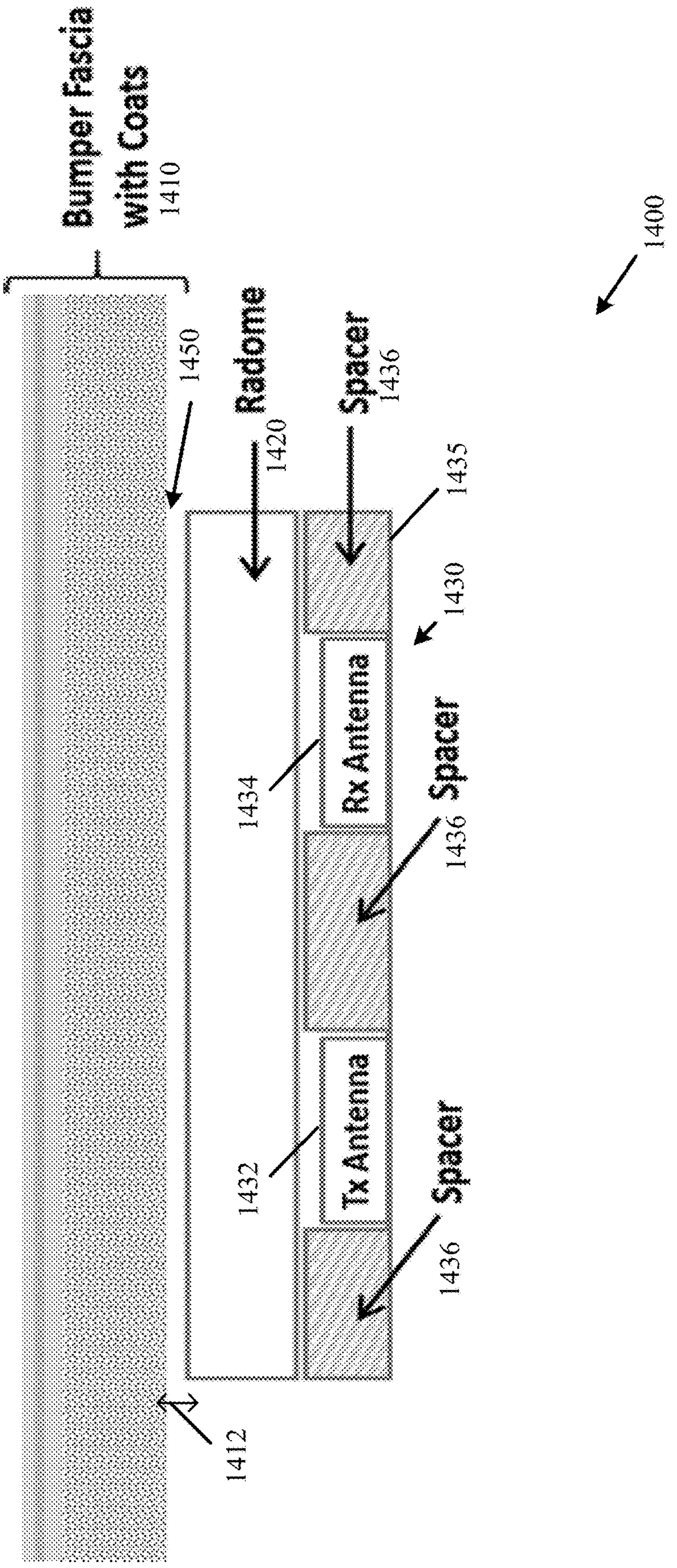
FIG. 14 is a schematic illustration of a system, in accordance with some demonstrative aspects.

Reference is made to FIG. 14, which schematically illustrates a system 1400, in accordance with some demonstrative aspects.

In some demonstrative aspects, as shown in FIG. 14, system 1400 may include a vehicle bumper fascia 1410, e.g., as described below.

In some demonstrative aspects, as shown in FIG. 14, system 1400 may include a radome 1420, which may be attached to the vehicle bumper fascia 1410, e.g., as described below.

In some demonstrative aspects, the bumper fascia 1410 may be coated with one or more coats, e.g., a primer coat, a base coat, a clean coat, and/or any other additional or alternative coat.

In some demonstrative aspects, as shown in FIG. 14, system 1400 may include an antenna array 1430, which may be implemented, for example, on a Printed Circuit Board (PCB) 1435, e.g., as described below.

In some demonstrative aspects, as shown in FIG. 14, the antenna array 1430 may be between the PCB 1435 and the radome 1420, e.g., as described below.

In some demonstrative aspects, as shown in FIG. 14, the antenna array 1430 may include a Tx antenna 1432 configured to transmit Tx radar signals via the radome 1420 and the vehicle bumper fascia 1410, e.g., as described below.

In some demonstrative aspects, as shown in FIG. 14, the antenna array 1430 may include an Rx antenna 1434 configured to receive Rx radar signals based on the Tx radar signals, e.g., as described below.

In one example, radome 1420 may be configured to seal the antenna array 1430, and/or to protect the antenna array 1430 from the environment, e.g., from water, humidity, and/or dirt. For example, the radome 1420 may provide protection to the antenna array 1430, in addition to protection provided by the vehicle bumper fascia 1410, which may act like a "cover", and/or may protect the antenna array 1430.

In some demonstrative aspects, the radome 1420 may be over radar antenna 1430, may cover radar antenna 1430, may extend to the sides of radar antenna 1430, may extend to the PCB 1435 on which radar antenna 1430 is implemented, or may extend beyond and below the PCB 1435. In other aspects, the radome 1420 may be configured to be over, cover, and/or seal the radar antenna 1430, the PCB 1435, and/or one or more other elements.

Some or all of the various implementations described with respect to FIG. 14, may apply to other systems described below, e.g., with respect to FIG. 16A, FIG. 16B, FIG. 21, FIG. 22, FIG. 23, FIG. 24, FIG. 25, FIG. 26, and/or FIG. 27.

In some demonstrative aspects, as shown in FIG. 14, system 1400 may include an absorbing spacer 1436 in a spacer area between the PCB 1435 and the radome 1420, e.g., as described below.

In some demonstrative aspects, as shown in FIG. 14, the spacer area may separate the Tx antenna 1432 from the Rx antenna 1434, e.g., as described below.

In some demonstrative aspects, the spacer area may surround the Tx antenna 1332, e.g., as described below.

In some demonstrative aspects, the spacer area may surround the Rx antenna 1334, e.g., as described below.

In some demonstrative aspects, the absorbing spacer 1436 may be configured to absorb reflected signals, which may include reflection of the Tx radar signals from the vehicle bumper fascia 1410, e.g., as described below.

In some demonstrative aspects, the absorbing spacer 1436 may be configured to absorb direct signals, e.g., Tx radar signals propagating from the Tx antenna 1432 directly towards the Rx antenna 1334, e.g., as described below.

In some demonstrative aspects, the absorbing spacer 1436 may include carbon loaded plastic, e.g., as described below.

In other aspects, the absorbing spacer 1436 may include or may be formed of any other additional or alternative material.

In some demonstrative aspects, a volume resistivity of the carbon loaded plastic may be between 5 Ohm-centimeter (Ohm*cm) and 10 Ohm*cm, e.g., as described below.

In other aspects, the absorbing spacer 1436 may have any other volume resistivity.

In some demonstrative aspects, there may be a very small gap, or even substantially no gap, between a surface of the radome 1420 and a surface of the vehicle bumper fascia 1410, e.g., as descried below.

In some demonstrative aspects, at least part of a surface of the radome 1420 may be directly in touch with a surface of the vehicle bumper fascia 1410, e.g., as descried below.

In some demonstrative aspects, there may be a very small, e.g., minimal, gap between the surface of the radome 1420 and the surface of the vehicle bumper fascia 1410, e.g., as descried below.

In some demonstrative aspects, a distance 1412 between the surface of the radome 1420 and the surface of the vehicle bumper fascia 1410 may be less than 50 millimeter (mm), e.g., as descried below.

In some demonstrative aspects, the distance 1412 between the surface of the radome 1420 and the surface of the vehicle bumper fascia 1410 may be less than 30 mm, e.g., as descried below.

In some demonstrative aspects, the distance 1412 between the surface of the radome 1420 and the surface of the vehicle bumper fascia 1410 may be less than 20 mm, e.g., as descried below.

In some demonstrative aspects, the distance 1412 between the surface of the radome 1420 and the surface of the vehicle bumper fascia 1410 may be less than 10 mm, e.g., as descried below.

In some demonstrative aspects, the distance 1412 between the surface of the radome 1420 and the surface of the vehicle bumper fascia 1410 may be less than 5 mm, e.g., as descried below.

In some demonstrative aspects, the distance 1412 between the surface of the radome 1420 and the surface of the vehicle bumper fascia 1410 may be less than 3 mm, e.g., as descried below.

In some demonstrative aspects, the distance 1412 between the surface of the radome 1420 and the surface of the vehicle bumper fascia 1410 may be less than 2 mm, e.g., as descried below.

In some demonstrative aspects, the distance 1412 between the surface of the radome 1420 and the surface of the vehicle bumper fascia 1410 may be less than 1 mm, e.g., as descried below.

In some demonstrative aspects, the distance 1412 between the surface of the radome 1420 and the surface of the vehicle bumper fascia 1410 may be 0.1 mm or less, e.g., as descried below.

In other aspects, any other distance 1412 may be implemented between the surface of the radome 1420 and the surface of the vehicle bumper fascia 1410.

In some demonstrative aspects, at least part of the radome 1420 may directly interface with the surface of the vehicle bumper fascia 1410, e.g., without any gap.

In some demonstrative aspects, at least part of the radome 1420 may be positioned as close as possible, e.g., in direct contact with, or with a small gap to, the surface of the vehicle bumper fascia 1410, for example, to provide a technical solution to reduce the number of interfacing layers between radome 1420 and the vehicle bumper fascia 1410, which may create reflected self-interference signals, e.g., as described below.

In some demonstrative aspects, system 1400 may provide a technical solution, which may provide one or aesthetic benefits, e.g., avoiding the use of cut-out windows, while mitigating catastrophic radiation-pattern distortion and/or Tx-Rx isolation degradation, e.g., as described below.

In some demonstrative aspects, system 1400 may provide a technical solution, which may bring the radome 1420 as close as possible to the vehicle bumper fascia 1410.

In some demonstrative aspects, system 1400 may provide a technical solution, which may use the absorbing spacer 1436 to mitigate the direct interference signals 1315 (FIG. 13) and/or the reflected interference signals 1317 (FIG. 13).

In some demonstrative aspects, there may be no gap between radome 1420 and the surface of the vehicle bumper fascia 1410, for example, in some implementations.

In some demonstrative aspects, an implementation with a zero or minimum gap between radome 1420 and the surface of the vehicle bumper fascia 1410 may provide a technical solution to localize reflected self-interferences, for example, such that the localized reflected waves may be absorbed by the absorbing spacer 1436.

For example, it may be intuitively assumed a larger distance between radome 1420 and the surface of the vehicle bumper fascia 1410 may reduce the level of reflections caused by the vehicle bumper fascia 1410. However, a larger distance between radome 1420 and the surface of the vehicle bumper fascia 1410 may result in radiated waves from Tx antenna 1432 spreading more in angle and impacting a larger number of adjacent Rx antenna elements 1434, e.g., as the distance between radome 1420 and the surface of the vehicle bumper fascia 1410 increases. For example, considering reflections due to interaction between multiple Tx element antennas 1432 and bumper fascia layers of bumper fascia 1410, complicated constructive and/or destructive interferences may affect the Rx antenna elements 1434. These interferences may result in severe pattern distortion and/or Tx-Rx isolation level degradation, e.g., as described above.

In some demonstrative aspects, the zero or minimum gap between radome 1420 and the surface of the vehicle bumper fascia 1410 may provide a technical solution to localize the reflected self-interference in a relatively narrow angle. For example, a smaller gap between radome 1420 and the surface of the vehicle bumper fascia 1410 may result in a narrower angle of the reflected self-interference.

In some demonstrative aspects, the zero or minimum gap between radome 1420 and the surface of the vehicle bumper fascia 1410 may provide a technical solution to mitigate, or even prevent, the radiation pattern distortion and/or the Tx-Rx isolation level degradation.

In some demonstrative aspects, implementing system 1400 without a cut-out window in the vehicle bumper fascia 1410 may result in some loss of performance. For example, there may be a minimal loss, e.g., between 1-2 dB in one way, which may be due the use of the non-cut-out bumper fascia 1410, and/or due to a mismatch loss of the reflected waves.

In some demonstrative aspects, some performance loss, e.g., due to the mismatch loss of the reflected waves, may be reduced, for example, by an impedance-matching "gap" layer between radome 1420 and vehicle bumper fascia 1410, e.g., as described below.

In some demonstrative aspects, system 1400 may include an integrated radome-spacer structure, which may be formed by a plastic layer, e.g., as described below.

In some demonstrative aspects, the integrated radome-spacer structure may include radome 1420 and absorbing spacer 1436, e.g., as described below.

For example, radome 1420 and absorbing spacer 1436 may be integrally formed by a plastic layer, e.g., as described below.

In other aspects, radome 1420 and absorbing spacer 1436 may be formed of different materials and/or may be implemented as two separate elements, units, layers and/or structures.

In some demonstrative aspects, absorbing spacer 1436 may be formed from a plastic material. For example, absorbing spacer 1436 may be formed of a plastic material, which may be loaded with carbon pigment.

In some demonstrative aspects, absorbing spacer 1436 may be configured to support the radome 1420, and to suppress direct and/or reflected self-interference signals from Tx antenna 1432 towards Rx antenna 1434.

In some demonstrative aspects, absorbing spacer 1436 may mechanically support the radome, and/or may absorb localized, reflected waves, which are reflected by bumper fascia 1410.

In some demonstrative aspects, absorbing spacer 1436 may be implemented, for example, by adding carbon material into a plastic radome material of radome 1420.

In some demonstrative aspects, the absorbing spacer 1436 and radome 1420 may be combined as a single body, e.g., in the form of an integrated radome-spacer structure. For example, the carbon material may be mixed in the portion of the absorbing spacer structure 1436, e.g., while the portion of radome 1420 may substantially not include the carbon material.

In some demonstrative aspects, a volume resistivity of the carbon-loaded spacer 1436 may be in a range between 5 and 10 Ω·cm, for example, to provide reasonable absorption performance, e.g., at a 77-GHz radar band.

In other aspects, absorbing spacer 1436 may be formed of any other material, and/or may have any other volume resistivity.

Figure 15:
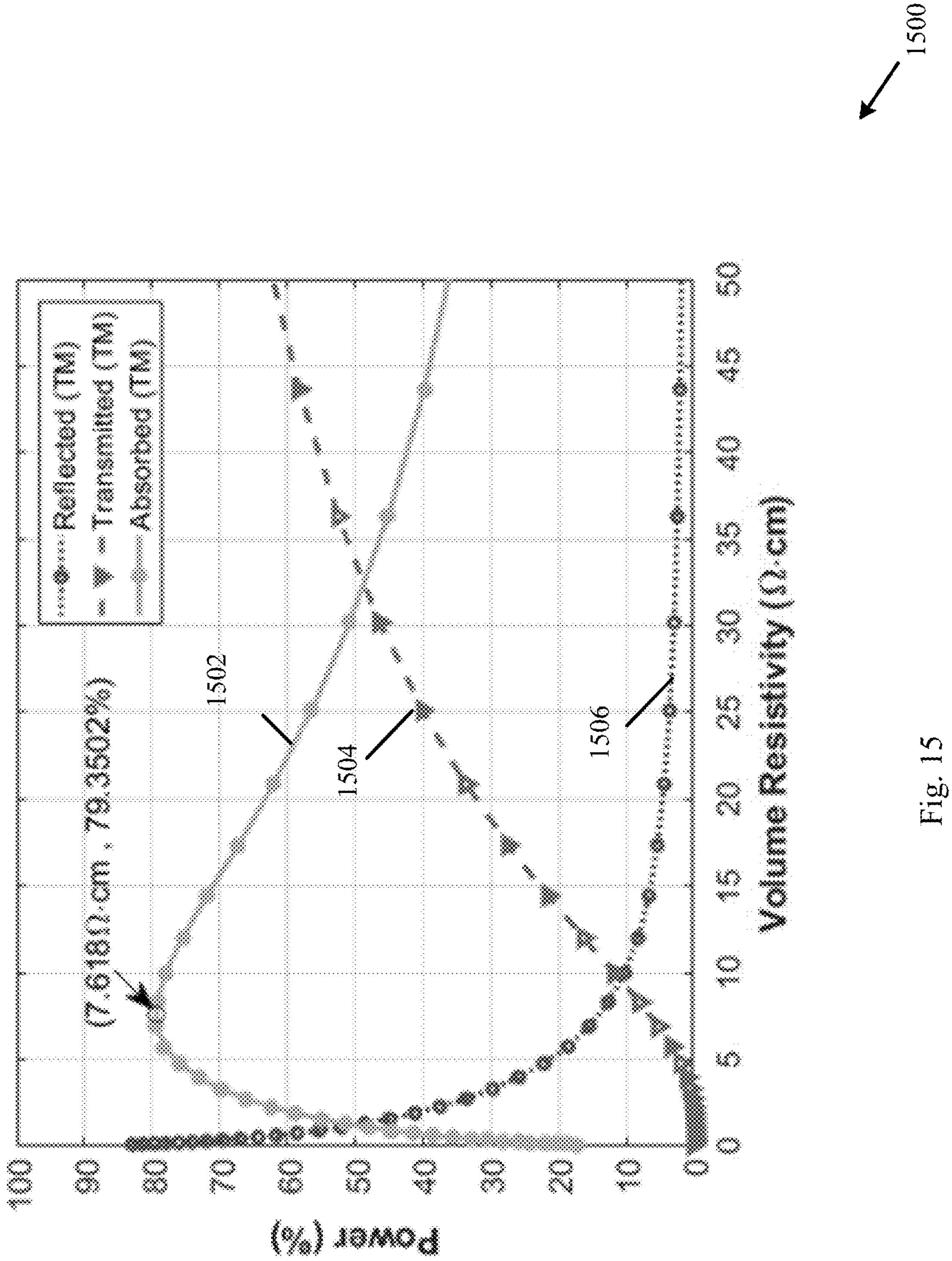
FIG. 15 is a schematic illustration of a graph depicting electronic properties of a carbon-loaded plastic layer versus a volume resistivity of the carbon-loaded plastic layer, in accordance with some demonstrative aspects.

Reference is made to FIG. 15, which schematically illustrates a graph 1500 depicting electronic properties of a carbon-loaded spacer versus a volume resistivity of the carbon-loaded spacer, in accordance with some demonstrative aspects. For example, absorbing spacer 1436 (FIG. 14) may be configured according to the electronic properties of FIG. 15.

In one example, the electronic properties of the carbon-loaded spacer depicted in FIG. 15, may be measured, for example, with respect to a 1 mm thick carbon loaded spacer at a frequency of 78.5 GHz.

For example, as shown in FIG. 15, a curve 1502 depicts absorption of power versus a volume resistivity, a curve 1504 depicts a transmission of power versus the volume resistivity, and a curve 1506 depicts a reflection of power versus the volume resistivity.

In some demonstrative aspects, as shown in FIG. 15, the carbon-loaded spacer may have an improved absorption of surface waves, e.g., about 75% absorption; a reduced reflectivity, e.g., about 10% reflectivity; and a reduced transmission power of the surface waves, e.g., about 15%, for example, when the volume resistivity of the carbon-loaded spacer is about 10 Ohm*cm, for example, while maintaining a rigid structure of the carbon-loaded spacer.

Figure 16A:
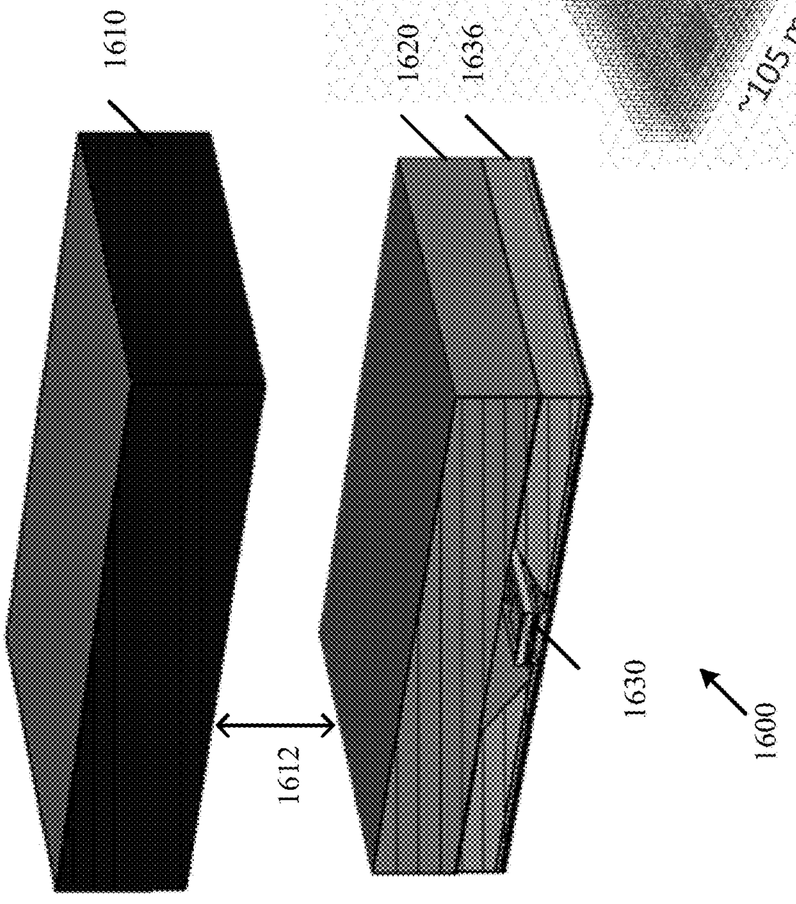
FIG. 16A is a schematic cross sectional illustration of a system including an antenna array.
Figure 16B:
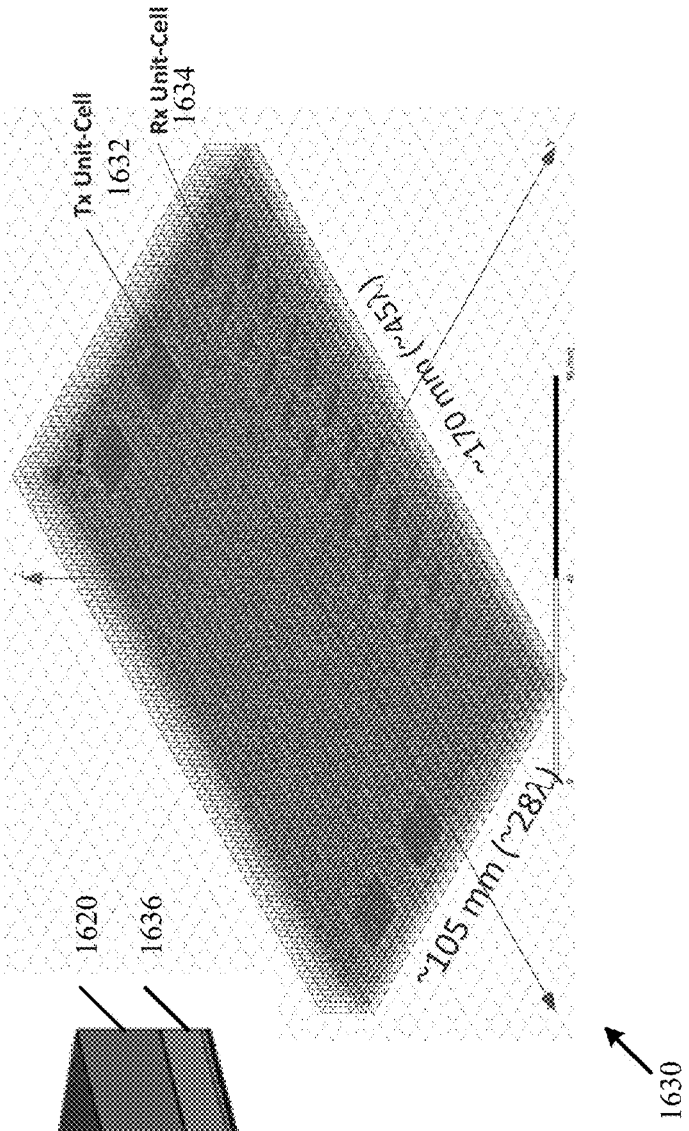
FIG. 16B, is a schematic illustration of a three dimensional (3D) model of the antenna array, in accordance with some demonstrative aspects.

Reference is made to FIG. 16A, which schematically illustrates a cross sectional view of a system 1600 including an antenna array 1630, and to FIG. 16B, which schematically illustrates a 3D model of the antenna array 1630, in accordance with some demonstrative aspects. For example, system 1400 (FIG. 14) may include one or more elements of system 1600 (FIG. 16), and/or may perform one or more operations and/or functionalities of system 1600 (FIG. 16)

In some demonstrative aspects, system 1600 may be utilized for one or more simulations, for example, to demonstrate a proof-of-concept, for example, of system 1400 (FIG. 14).

In some demonstrative aspects, as shown in FIG. 16A, system 1600 may include antenna array 1630, e.g., including Tx antenna 1432 (FIG. 14) and Rx antenna 1434 (FIG. 14), an absorbing spacer 1636, e.g., absorbing spacer 1436 (FIG. 14), a radome 1620, e.g., radome 1420 (FIG. 14), and a vehicle bumper fascia 1610, e.g., vehicle bumper fascia 1410 (FIG. 14).

In some demonstrative aspects, as shown in FIG. 16A, there may be a distance 1612 between the surface of the radome 1620 and the surface of the vehicle bumper fascia 1610.

In some demonstrative aspects, as shown in FIG. 16B, antenna array 1630 may include a Tx array of Tx antenna elements 1632, and an Rx array of Rx antenna elements 1634.

In one example, the 3D model of the antenna array 1630 may be modeled, for example, using a full-wave electromagnetic simulation tool.

In one example, Tx antenna elements 1632 and/or Rx antenna elements 1634 may be constructed by a unit-cell structure, e.g., having a balanced, stacked microstrip antennas inside a via fence, which may be modeled as a solid rectangle block. For example, the Rx antenna elements 1634 may be constructed by staggered unit-cell structures, e.g., to increase a resolution of a synthesized virtual array.

In one example, antenna array 1630 may be manufactured using a package technology, e.g., antenna-in-package, and/or may be soldered on a radar PCB.

In another example, antenna array 1630 may be implemented directly on a PCB.

In some demonstrative aspects, antenna array 1630 may be modeled, for example, using a Finite Array Domain Decomposition Method (FADDM), e.g., due to the extremely-large electrical size of the entire array at a 77-GHz radar band (76-81 GHz).

In one example, the simulations described below may be performed assuming absorbing spacer 1636 includes a carbon-loaded spacer with a volume resistivity of 10 Ω·cm.

Figure 17A:
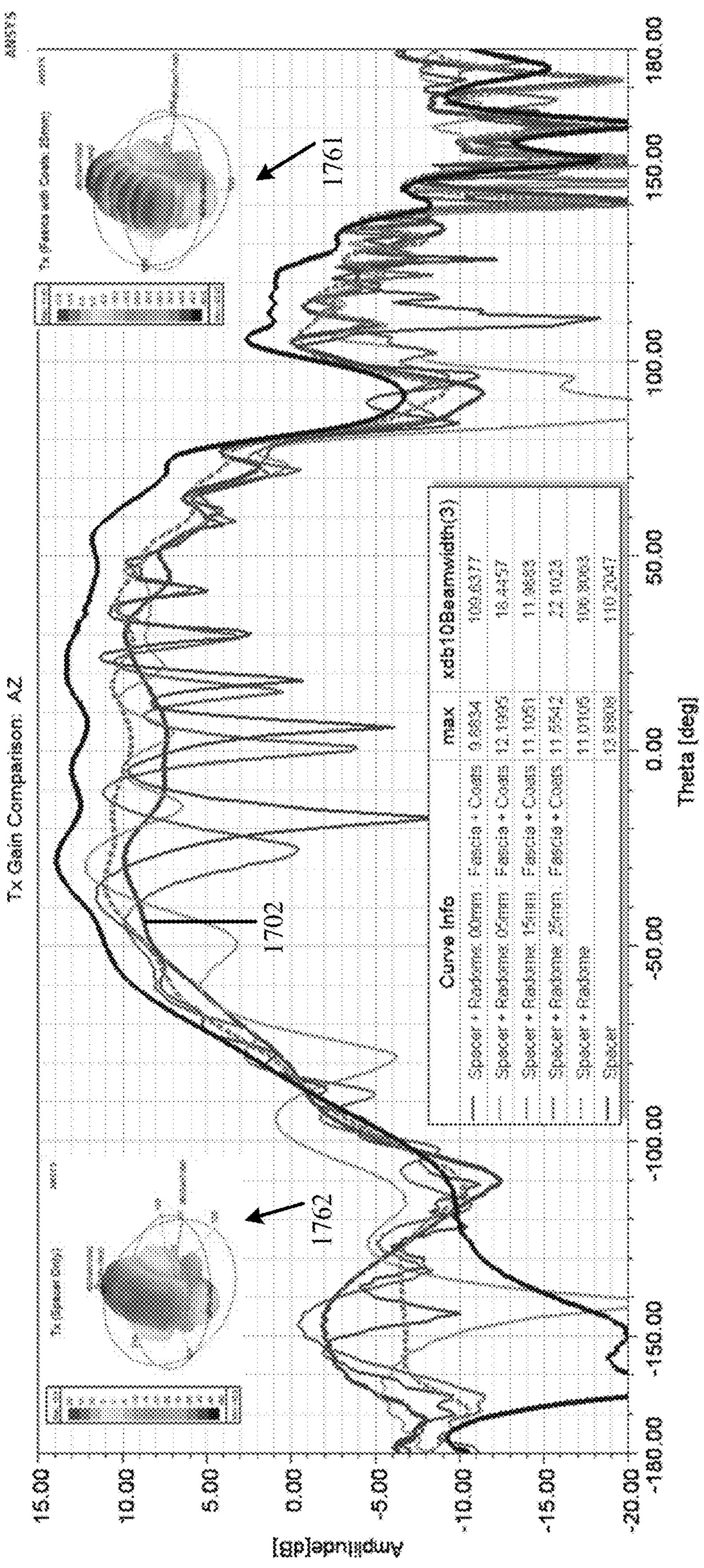
FIG. 17A is a schematic illustration of a graph depicting simulated azimuth spectrums of a radar system.
Figure 17B:
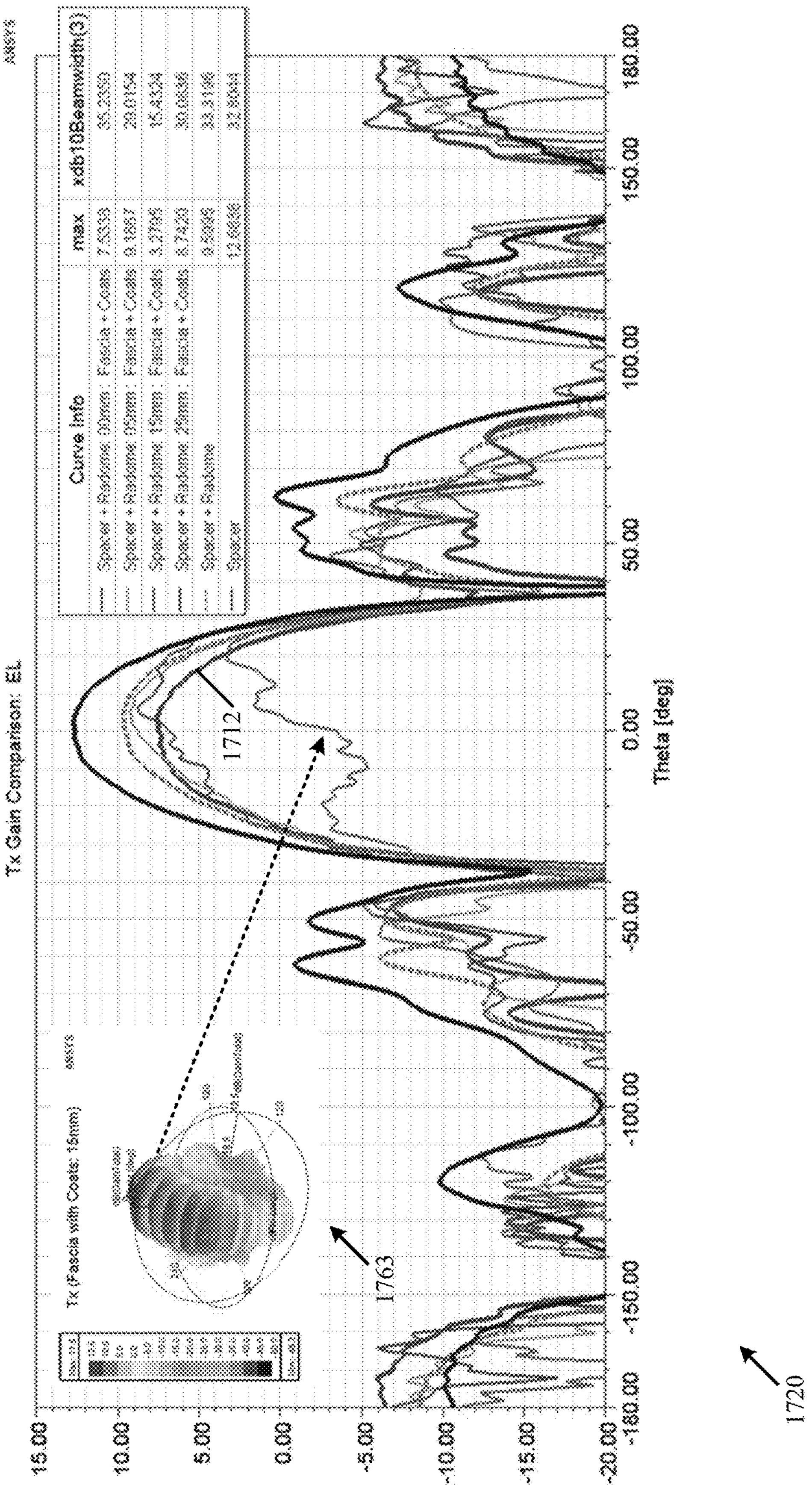
FIG. 17B is a schematic illustration of a graph depicting simulated elevation spectrums of the radar system, in accordance with some demonstrative aspects.

Reference is made to FIG. 17A, which schematically illustrates a graph 1710 depicting simulated azimuth spectrums of a radar system, and to FIG. 17B, which schematically illustrates a graph 1720 depicting simulated elevation spectrums of the radar system, in accordance with some demonstrative aspects.

In one example, the graphs of FIGS. 17A and 17B depict simulation results corresponding to system 1600 (FIG. 16). For example, the graphs of FIGS. 17A and 17B depict simulation results, e.g., with respect to a Tx antenna 1632 (FIG. 16) at a frequency of 78.5 GHz, for a plurality of different distances 1612 (FIG. 16) between the surface of the radome 1620 (FIG. 16) and the surface of the vehicle bumper fascia 1610 (FIG. 16). For example, the plurality of distances may include a distance of 0 mm, a distance of 5 mm, a distance of 15 mm, and a distance of 25 mm.

In some demonstrative aspects, as shown in FIG. 17A, azimuth radiation patterns at the distances 1612 (FIG. 16) of 5 mm, 15 mm and 25 mm may be distorted, for example, compared to azimuth radiation patterns achieved when vehicle bumper fascia 1610 (FIG. 16) is not implemented.

In some demonstrative aspects, as shown in FIG. 17A, an azimuth radiation pattern 1702 corresponding to a zero gap, e.g., a distance 1612 (FIG. 16) of 0 mm, may not be substantially distorted.

In some demonstrative aspects, as shown in FIG. 17A, a 3D spectrum pattern 1761, when the distance 1612 (FIG. 16) is 25 mm, may be distorted compared to a 3D spectrum pattern 1762 corresponding to a 0 mm distance 1612 (FIG. 16).

In some demonstrative aspects, as shown in FIG. 17B, elevation radiation patterns at the distances 1612 (FIG. 16) of 5 mm, 15 mm and 25 mm may be distorted, for example, compared to elevation radiation patterns achieved when vehicle bumper fascia 1610 (FIG. 16) is not implemented.

In some demonstrative aspects, as shown in FIG. 17B, an elevation radiation pattern 1712 corresponding to a zero gap, e.g., a distance 1612 (FIG. 16) of 0 mm, may not be substantially distorted.

In some demonstrative aspects, as shown in FIG. 17B, a 3D spectrum pattern 1763, when the distance 1612 (FIG. 16) is 15 mm, may be distorted.

Figure 18A:
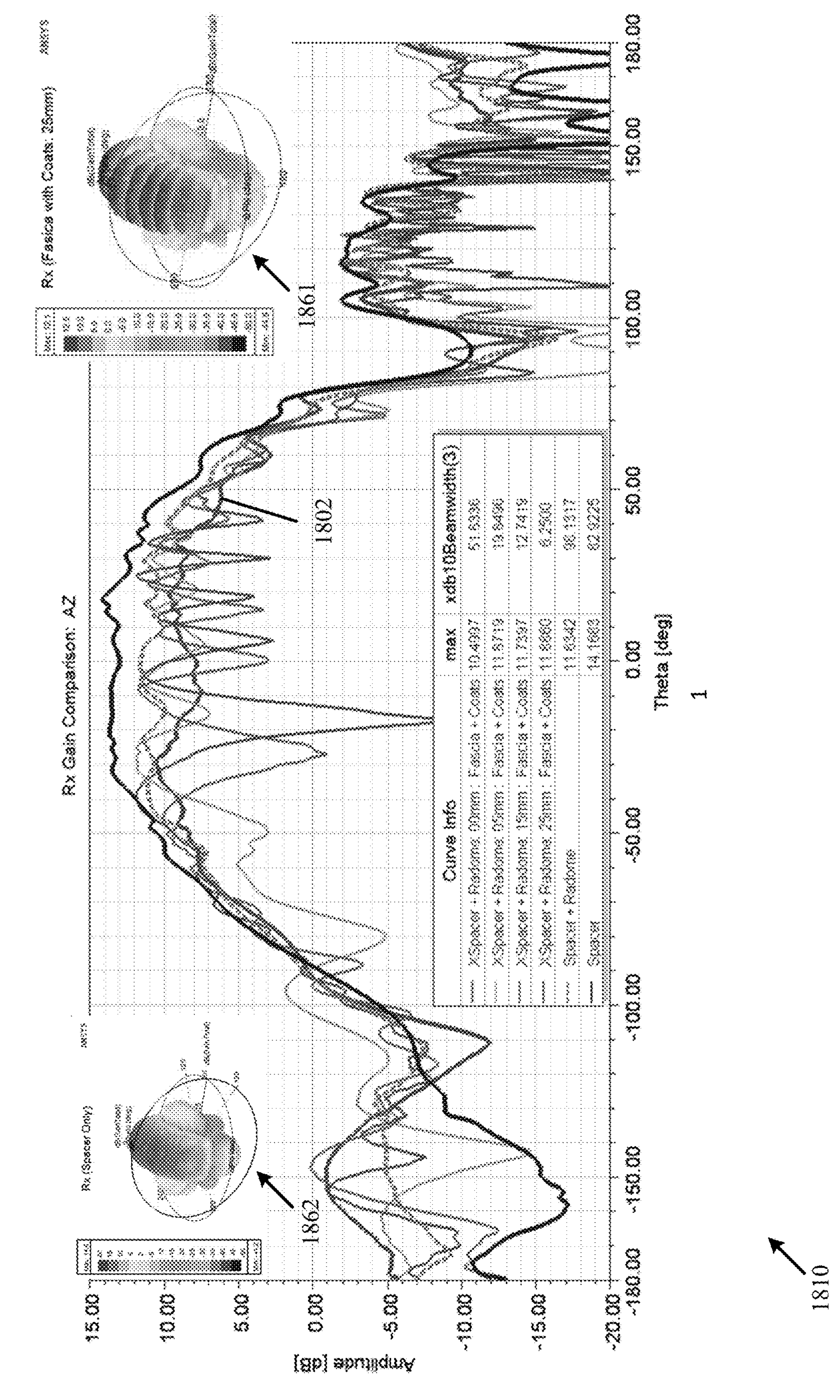
FIG. 18A is a schematic illustration of a graph depicting simulated azimuth spectrums of a radar system.
Figure 18B:
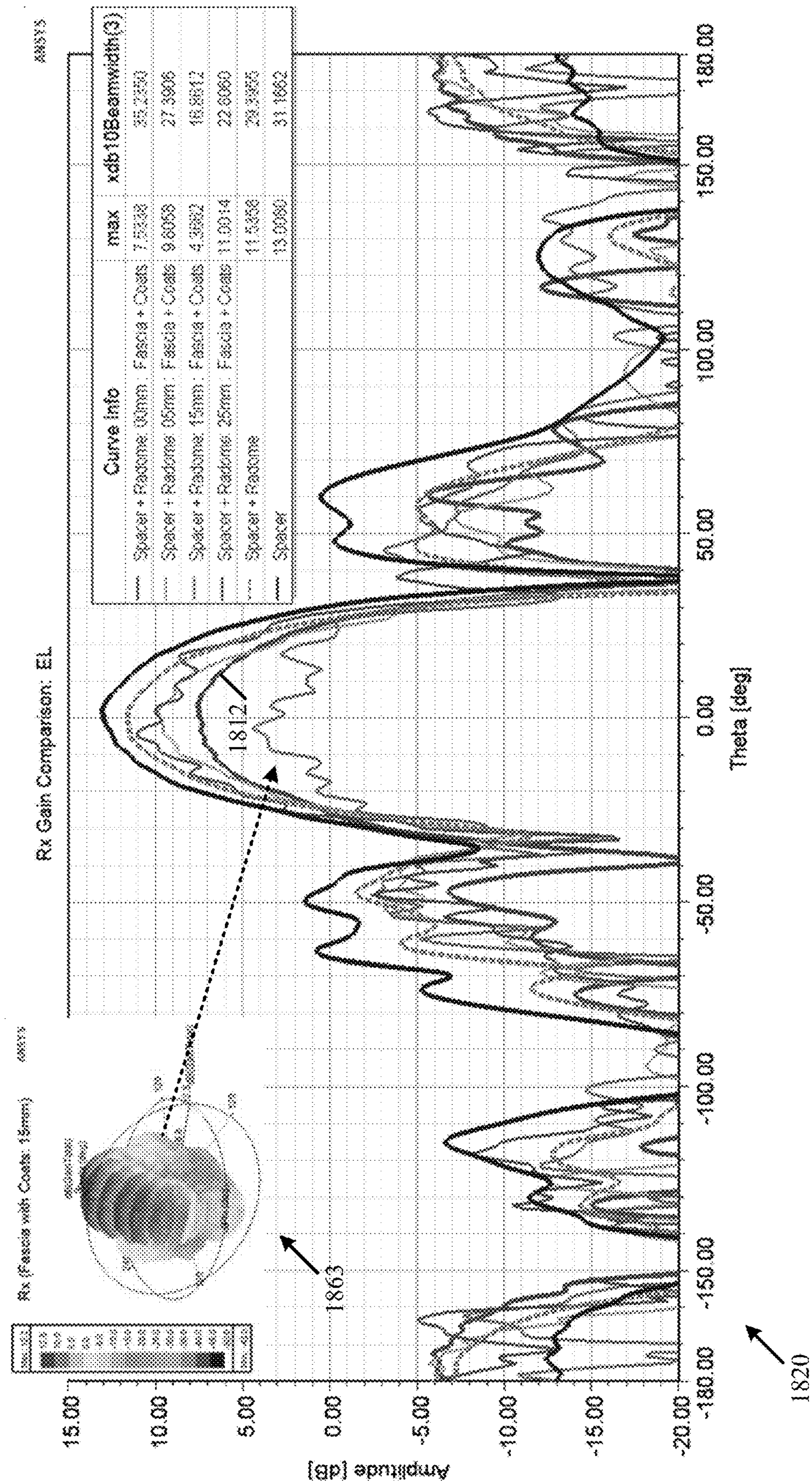
FIG. 18B is a schematic illustration of a graph depicting simulated elevation spectrums of the radar system, in accordance with some demonstrative aspects.

Reference is made to FIG. 18A, which schematically illustrates a graph 1810 depicting simulated azimuth spectrums of a radar system, and to FIG. 18B, which schematically illustrates a graph 1820 depicting simulated elevation spectrums of the radar system, in accordance with some demonstrative aspects.

In one example, the graphs of FIGS. 18A and 18B depict simulation results corresponding to system 1600 (FIG. 16). For example, the graphs of FIGS. 18A and 18B depict simulation results, e.g., with respect to an Rx antenna 1634 (FIG. 16) at a frequency of 78.5 GHz, for a plurality of different distances 1612 (FIG. 16) between the surface of the radome 1620 (FIG. 16) and the surface of the vehicle bumper fascia 1610 (FIG. 16). For example, the plurality of distances may include a distance of 0 mm, a distance of 5 mm, a distance of 15 mm, and a distance of 25 mm.

In some demonstrative aspects, as shown in FIG. 18A, azimuth radiation patterns at the distances 1612 (FIG. 16) of 5 mm, 15 mm and 25 mm may be distorted, for example, compared to azimuth radiation patterns achieved when vehicle bumper fascia 1610 (FIG. 16) is not implemented.

In some demonstrative aspects, as shown in FIG. 18A, an azimuth radiation pattern 1802 corresponding to a zero gap, e.g., a distance 1612 (FIG. 16) of 0 mm, may not be substantially distorted.

In some demonstrative aspects, as shown in FIG. 18A, a 3D spectrum pattern 1861, when the distance 1612 (FIG. 16) is 25 mm, may be distorted compared to a 3D spectrum pattern 1862 corresponding to a 0 mm distance 1612 (FIG. 16).

In some demonstrative aspects, as shown in FIG. 18B, elevation radiation patterns at the distances 1612 (FIG. 16) of 5 mm, 15 mm and 25 mm may be distorted, for example, compared to elevation radiation patterns achieved when vehicle bumper fascia 1610 (FIG. 16) is not implemented.

In some demonstrative aspects, as shown in FIG. 18B, an elevation radiation pattern 1812 corresponding to a zero gap, e.g., a distance 1612 (FIG. 16) of 0 mm, may not be substantially distorted.

In some demonstrative aspects, as shown in FIG. 18B, a 3D spectrum pattern 1863, when the distance 1612 (FIG. 16) is 15 mm, may be distorted.

In some demonstrative aspects, the distorted radiation patterns shown in FIGS. 17A, 17B, 18A, and 18B may result in catastrophic pattern distortion, e.g., in the form of a radiation null. This radiation null may create beam scan blindness, e.g., even at boresight.

In one example, it may be practically very challenging to predict the location of these radiation nulls, for example, as actual electrical properties of bumper fascia materials may not be known in general.

In some demonstrative aspects, as shown in FIGS. 17A, 17B, 18A, and 18B, a reasonable radiation pattern and/or beam width may be achieved by implementation of a short gap 1612 (FIG. 16), or no gap 1612 (FIG. 16). For example, as shown in FIGS. 17A and 18A, azimuth radiation patterns 1702 (FIG. 17A) and 1802 (FIG. 18A), corresponding to the zero gap implementation, may have a reasonable radiation pattern and/or a reasonable beam width, e.g., with a gain loss of about 1-2 dB. For example, as shown in FIGS. 17B and 18B, elevation radiation patterns 1712 (FIG. 17A) and 1812 (FIG. 18B), corresponding to the zero gap implementation, may have a reasonable radiation pattern and/or a reasonable beam width, e.g., with a gain loss of about 1-2 dB. These results are comparable to the azimuth radiation patterns achievable without vehicle bumper fascia 1610 (FIG. 16). The gain loss may be reasonable as it includes losses from vehicle bumper fascia 1610 (FIG. 16), and/or absorbed reflections.

In some demonstrative aspects, the absorbed reflections may be reduced, for example, by implementing one or more additional layers, e.g., a filler layer, between the radome and the vehicle bumper fascia, e.g., as described below.

Figure 19:
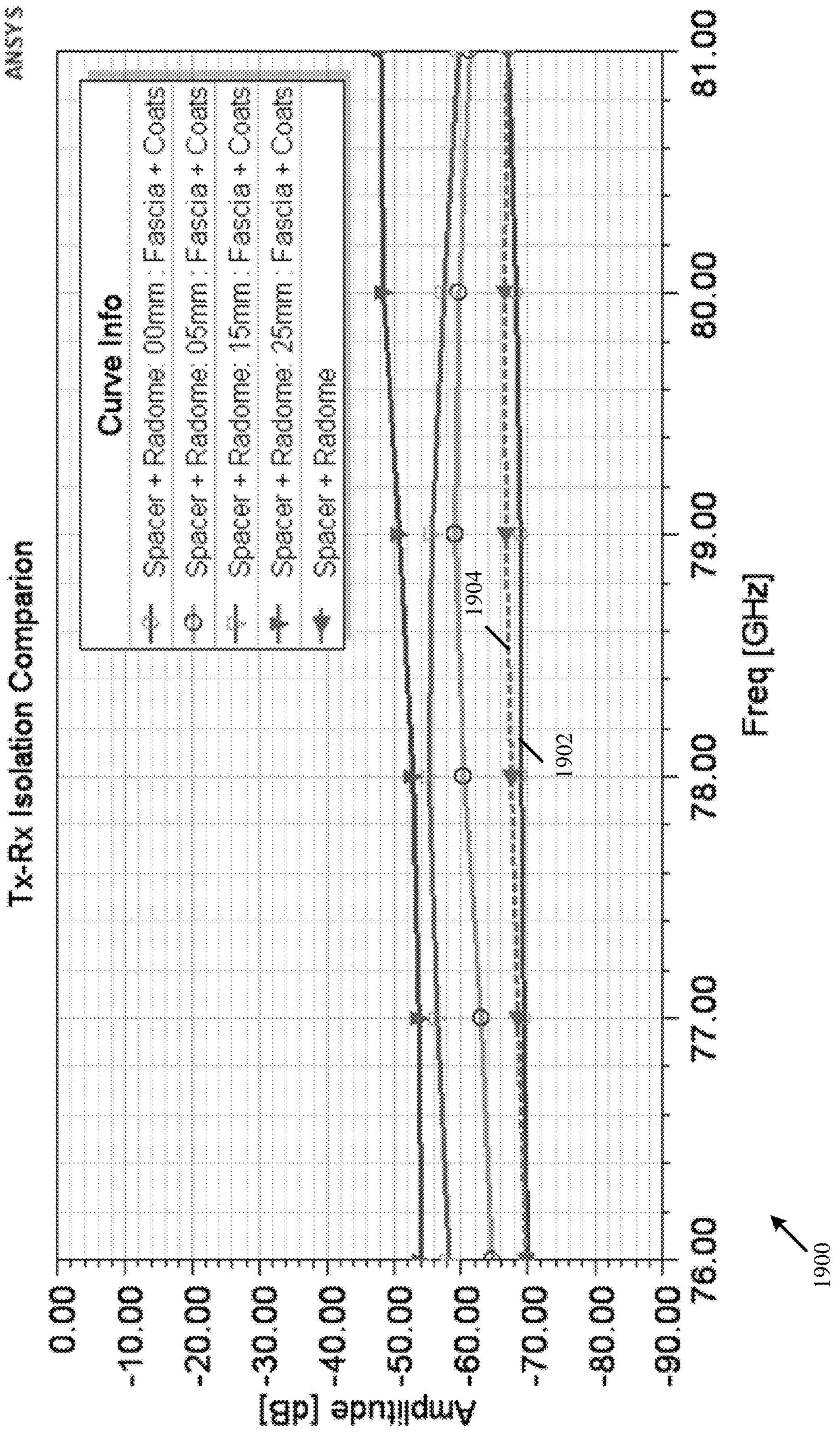
FIG. 19 is a schematic illustration of a graph depicting simulated Transmit-Receive (Tx-Rx) isolation levels versus frequencies for a plurality of different distances between a surface of a radome and a surface of a vehicle bumper fascia, in accordance with some demonstrative aspects.

Reference is made to FIG. 19, which schematically illustrates a graph 1900 depicting simulated Tx-Rx isolation levels versus frequencies for a plurality of different distances between a surface of a radome and a surface of a vehicle bumper fascia, in accordance with some demonstrative aspects.

In one example, graph 1900 depicts simulation results of isolation levels for system 1600 (FIG. 16) versus frequencies in a frequency range between 76-81 GHz, for a plurality of different distances 1612 (FIG. 16) between the surface of the radome 1620 (FIG. 16) and the surface of the vehicle bumper fascia 1610 (FIG. 16). For example, the plurality of distances may include a distance of 0 mm, a distance of 5 mm, a distance of 15 mm, and a distance of 25 mm.

In some demonstrative aspects, as shown in FIG. 19, the Tx-RX isolation level performance may get degrade, for example, as the distance 1612 (FIG. 16) increases, e.g., compared to an isolation level 1904 of a system without vehicle bumper fascia 1610 (FIG. 16).

In some demonstrative aspects, as shown in FIG. 19, an isolation level 1902 of a zero-gap implementation, e.g., with a 0 mm distance 1612 (FIG. 16), may substantially not be degraded, e.g., compared to an isolation level 1904. For example, as shown in FIG. 19, isolation level 1902 may be above 65 dB over an entire 77-GHz radar band, e.g., between 76 Ghz and 81 GHz.

Figure 20:
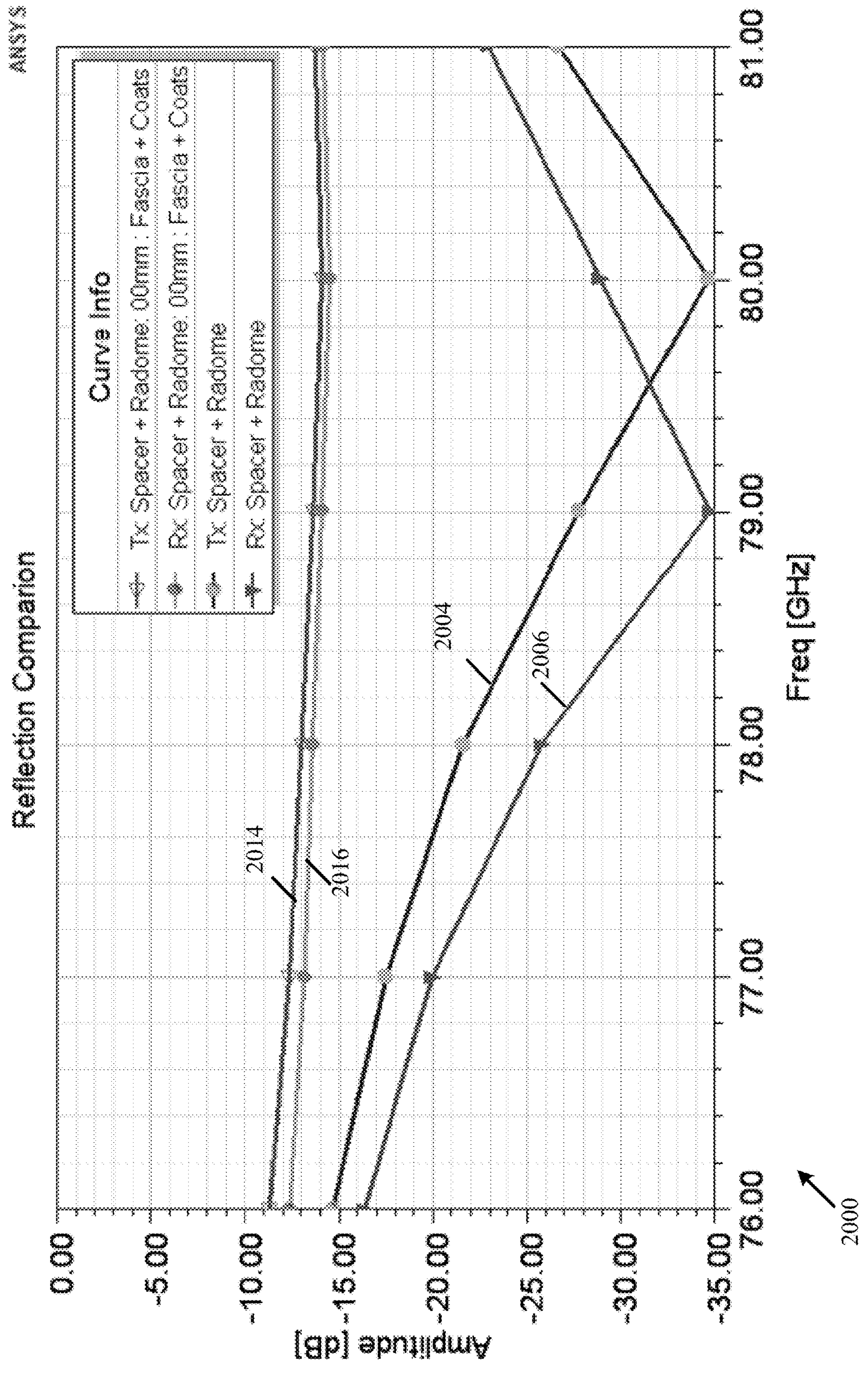
FIG. 20 is a schematic illustration of a graph depicting simulated reflection levels versus frequencies, in accordance with some demonstrative aspects.

Reference is made to FIG. 20, which schematically illustrates a graph 2000 depicting simulated reflection levels versus frequencies, in accordance with some demonstrative aspects.

In one example, graph 2000 depicts simulation results of reflection levels for system 1600 (FIG. 16) versus frequencies in a frequency range between 76-81 GHz, for a distance 1612 (FIG. 16) of 0 mm between the surface of the radome 1620 (FIG. 16) and the surface of the vehicle bumper fascia 1610 (FIG. 16).

In some demonstrative aspects, as shown in FIG. 20, a reflection level 2014 corresponds to reflection at a Tx antenna in an implementation including a carbon-loaded spacer, a radome, and a bumper fascia with a zero-gap between the radome and the bumper fascia; a reflection level 2016 corresponds to reflection at an Rx antenna in the implementation including the carbon-loaded spacer, the radome, and the bumper fascia with the zero gap; a reflection level 2004 corresponds to reflection at a Tx antenna in an implementation including a carbon-loaded spacer and a radome, e.g., without a bumper fascia; and a reflection level 2006 corresponds to reflection at an Rx antenna in the implementation including the carbon-loaded spacer and the radome, e.g., without the bumper fascia.

In some demonstrative aspects, as shown in FIG. 20, reflection at the Tx and Rx antennas may remain below −10 dB with a zero-gap between the radome and the bumper fascia, e.g., over the entire 77-GHz radar band. These results may indicate that the carbon-loaded spacer with a volume resistivity of 10 Ω·cm, e.g., absorbing spacer 1636 (FIG. 16), may provide acceptable results as an absorber over the entire 77-GHz radar band.

Referring back to FIG. 14, some aspects are described herein with respect to a system, e.g., system 1400, implemented with no distance and/or gap or a small distance or gap, between a surface of the radome 1420 and a surface of the vehicle bumper fascia 1410, e.g., as described above.

In some demonstrative aspects, one or more layers, e.g., a filler layer, may be implemented between radome 1420 and the vehicle bumper fascia 1410, e.g., as described below.

In some demonstrative aspects, a layer, e.g., a filler layer, an impedance-matching layer, and/or a polarization filter, may be implemented between radome 1420 and the vehicle bumper fascia 1410, e.g., as described below.

In other aspects, any other additional or alternative layers may be implemented between radome 1420 and the vehicle bumper fascia 1410.

Figure 21:
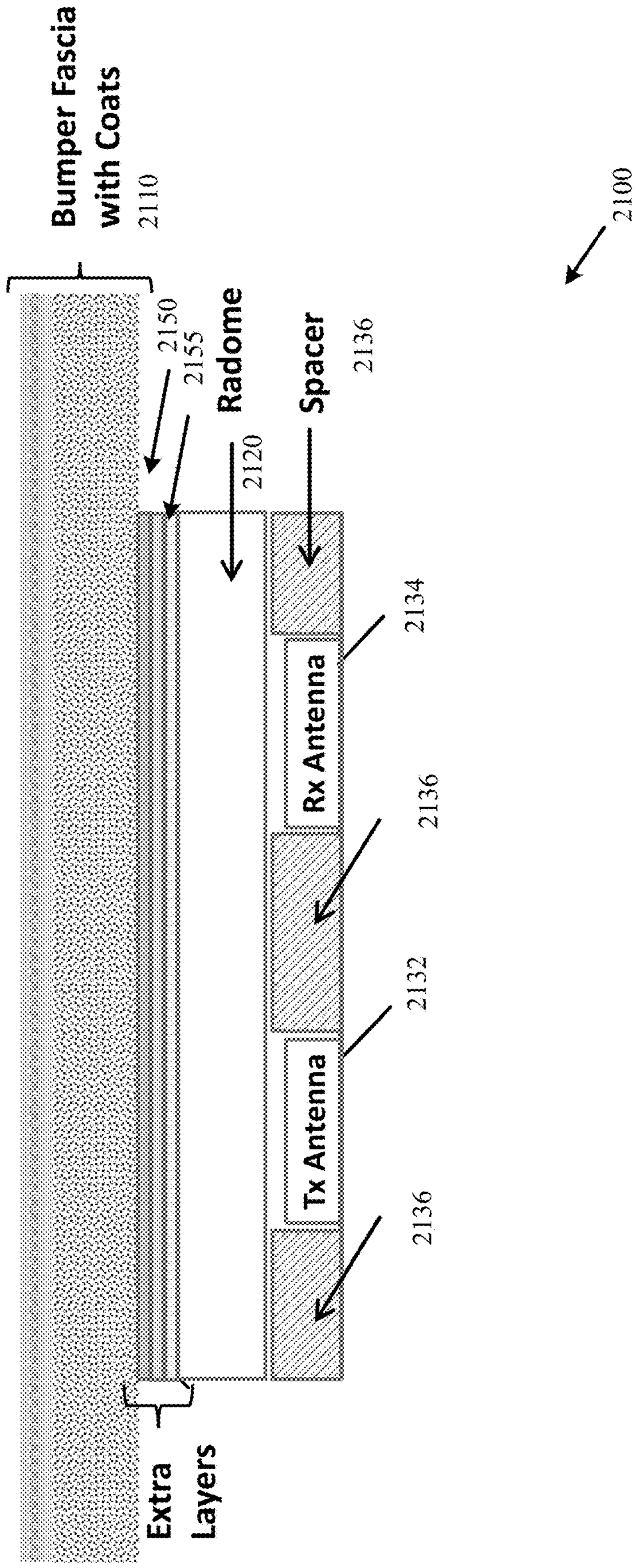
FIG. 21 is a schematic cross sectional illustration of a system, in accordance with some demonstrative aspects.

Reference is made to FIG. 21, which schematically illustrates a cross sectional view of a system 2100, in accordance with some demonstrative aspects. For example, system 2100 may include one or more elements of system 1400 (FIG. 14), and/or may perform one or more operations and/or functionalities of system 1400 (FIG. 14).

In some demonstrative aspects, as shown in FIG. 21, system 2100 may include an antenna array, e.g., including a Tx antenna array 2132 and an Rx antenna array 2134, an absorbing spacer 2136, a radome 2120, and a vehicle bumper fascia 2110.

In some demonstrative aspects, system 2100 may include one or more layers 2150 between radome 2120 and vehicle bumper fascia 2110, e.g., as described below.

In other demonstrative aspects, layers 2150 may be attached to bumper fascia 2110, and radome 2120 may be partially omitted, e.g., a top structure of the radome over the antennas may be omitted.

In some demonstrative aspects, the one or additional layers 2150 may include a filler layer, e.g. including a filler material, a resin material, an adhesive material, a silicon rubber material, or a combination thereof, an impedance-matching layer, and/or a polarization filter, e.g., as described below. In some aspects, layers 2150 may include holes or cavities, e.g., as described below.

In other aspects, the one or more layers 2150 may include any other additional and/or alternative layer.

In some demonstrative aspects, system 2100 may include an impedance-matching layer 2155 between the radome 2120 and the vehicle bumper fascia 2110, e.g., as described below.

In some demonstrative aspects, the impedance-matching layer 2155 may be configured to reduce an impedance difference between the radome 2120 and the vehicle bumper fascia 2110, e.g., as described below.

In some demonstrative aspects, the impedance-matching layer 2155 may be configured to provide an impedance match, e.g., an improved impedance match, at an interface between radome 2120 and vehicle bumper fascia 2110. For example, the impedance match may provide a technical solution to reduce a reflection level and/or a gain loss.

Referring back to FIG. 14, in some demonstrative aspects, system 1400 may include a filler layer between the radome 1420 and the vehicle bumper fascia 1410, e.g., as described below.

In some demonstrative aspects, the filler layer may fill an area between a curved surface of the vehicle bumper fascia 1410 and a surface of the radome 1420, e.g., as described below.

Figure 22:
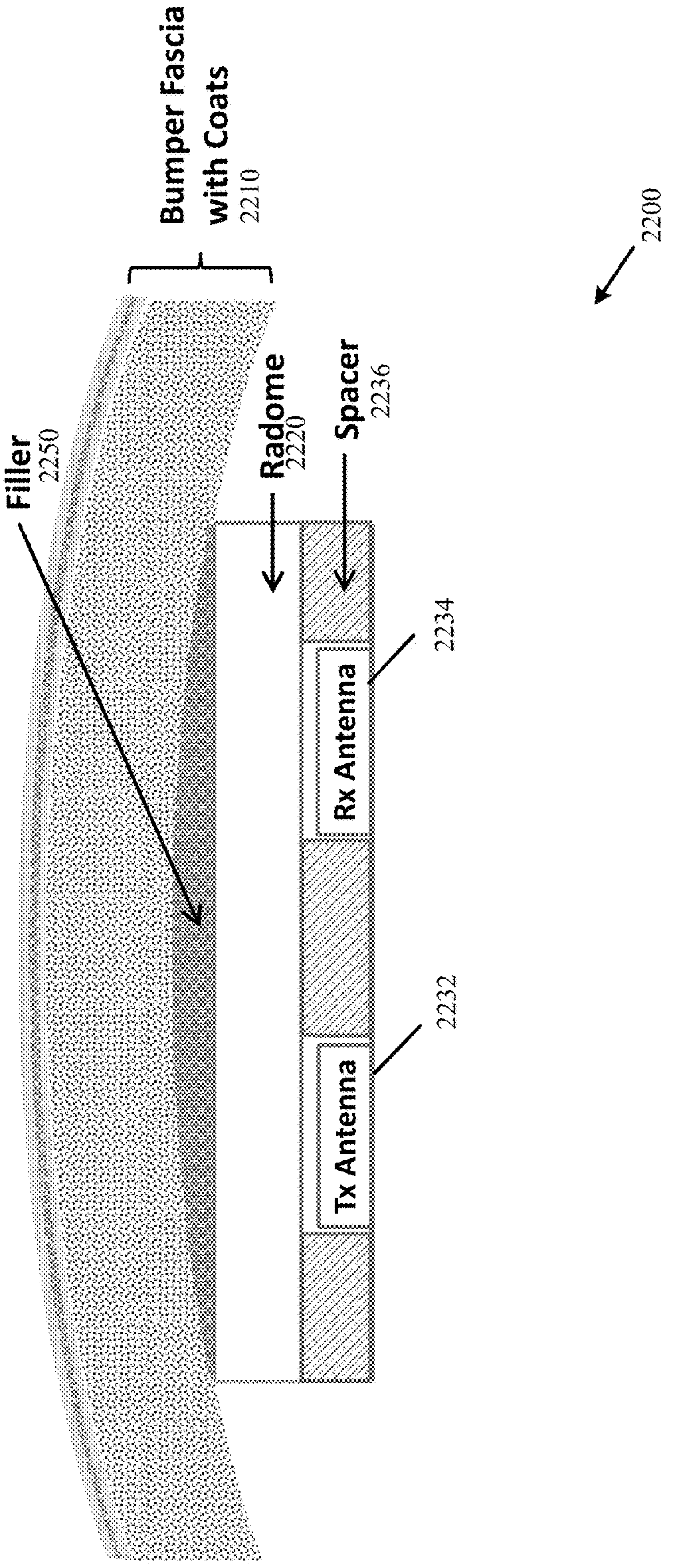
FIG. 22 is a schematic cross sectional illustration of a system, in accordance with some demonstrative aspects.

Reference is made to FIG. 22, which schematically illustrates a cross sectional view of a system 2200, in accordance with some demonstrative aspects. For example, system 2200 may include one or more elements of system 1400 (FIG. 14), and/or may perform one or more operations and/or functionalities of system 1400 (FIG. 14).

In some demonstrative aspects, as shown in FIG. 22, system 2200 may include an antenna array, e.g., including a Tx antenna array 2232 and an Rx antenna array 2234, an absorbing spacer 2236, a radome 2220, and a vehicle bumper fascia 2210.

In some demonstrative aspects, as shown in FIG. 22, system 2200 may include a filler layer 2250 between the radome 2220 and the vehicle bumper fascia 2210.

In some demonstrative aspects, as shown in FIG. 22, the filler layer 2250 may fill an area between a curved surface of the vehicle bumper fascia 2210 and a surface of the radome 2220.

In some demonstrative aspects, filler layer 2250 may be inserted between radome 2220 and the vehicle bumper fascia 2210, for example, when the vehicle bumper fascia 2210, has a curved shape. In one example, a vehicle bumper fascia 2210 with a curved shape may be implemented, for example, for side/corner radar locations.

In some demonstrative aspects, system 2200 may include an integrated radome-spacer-filler structure. For example, the integrated radome-spacer-filler structure may include radome 2210, absorbing spacer 2236, and one or more filler layers 2250.

In some demonstrative aspects, the filler layer 2250 may have a dielectric constant of 100 or less, e.g., as described below.

In some demonstrative aspects, the filler layer 2250 may have a dielectric constant of 50 or less, e.g., as described below.

In some demonstrative aspects, the filler layer 2250 may have a dielectric constant of 20 or less, e.g., as described below.

In some demonstrative aspects, the filler layer 2250 may have a dielectric constant of 12 or less, e.g., as described below.

In other aspects, the filler layer 2250 may have any other dielectric constant.

In some demonstrative aspects, filler layer 2250 may include multiple layers, which may be configured, for example, to control an effective dielectric constant of filler layer 2250, e.g., as described below.

In some demonstrative aspects, filler layer 2250 may include multiple layers, which may be configured, for example, to control an "electric thickness" of each layer material e.g., as described below.

In some demonstrative aspects, the filler layer 2250 may include a carbon-loaded area over at least part of the absorbing spacer 2236, e.g., as described below.

In some demonstrative aspects, the filler layer 2250 may have a loss tangent of 0.01 or less in an area over the antenna array 2230, e.g., as described below. In other aspects, any other loss tangent may be implemented.

In some demonstrative aspects, a filler material of filler layer 2250 may have a loss tangent between 0.001 and 0.01, for example, to reduce penetration loss. For example, the loss tangent of filler layer 2250 may be configured based, for example, on detection range requirements of a radar system utilizing system 2200.

In some demonstrative aspects, as shown in FIG. 22, filler layer 2250 may have a cross sectional shape of an almond, and may be inserted between the radome 2220 and the vehicle bumper fascia 2210, e.g., to reduce reflections, for example, when vehicle bumper fascia 2210 has a curved structure.

In some demonstrative aspects, radome 2220 may be configured to have a curved shape.

In some demonstrative aspects, filler layer 2250 may have a cross sectional shape of a multi-layered curved filter, for example, when radome 2220 has a curved shape.

In some demonstrative aspects, filler layer 2250 may include a rigid elastomeric material, e.g., as described below.

In some demonstrative aspects, filler layer 2250 may include silicone rubber, e.g., as described below.

In other aspects, filler layer may include, or may be formed of, any other additional or alternative material.

In some demonstrative aspects, the filler layer 2250 may include a plurality of perforated holes ("cavities"), e.g., as described below.

Figure 23:
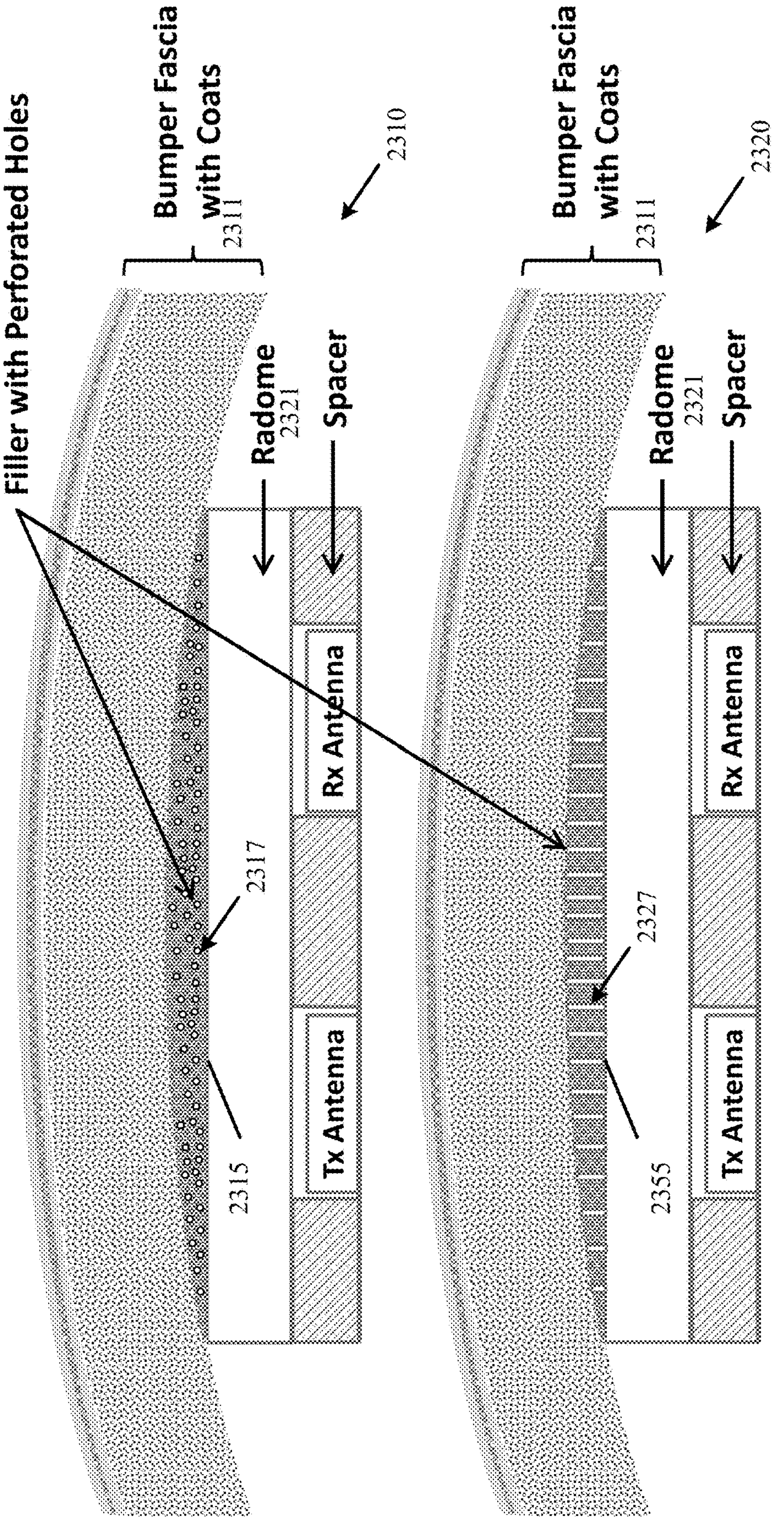
FIG. 23 are schematic cross sectional illustrations first and second systems, in accordance with some demonstrative aspects.

Reference is made to FIG. 23, which schematically illustrates a cross sectional view of a first system 2310, and a cross sectional view of a second system 2320, in accordance with some demonstrative aspects. For example, system 2310 and/or system 2320 may include one or more elements of system 1400 (FIG. 14), and/or may perform one or more operations and/or functionalities of system 1400 (FIG. 14).

In some demonstrative aspects, as shown in FIG. 23, system 2310 may include a filler layer 2315 including a plurality 2317 of perforated holes or cavities.

In some demonstrative aspects, as shown in FIG. 23, system 2320 may include a filler layer 2355 including a plurality of perforated holes (cavities) 2327.

In some demonstrative aspects, filler layers 2355 and/or 2315 may include one layer or multiple layers, for example, with perforated holes (cavities).

In some demonstrative aspects, the cavities 2317 and/or the perforated holes 2327 may have a spherical shape, a cylindrical shape, or any other shape.

In some demonstrative aspects, the perforated holes 2317 may be configured, for example, to control an effective dielectric constant of the filler layer 2315.

In some demonstrative aspects, the perforated holes 2327 may be configured, for example, to control an effective dielectric constant of the filler layer 2355.

In some demonstrative aspects, the perforated holes 2317 and/or the cavities 2327 may be configured, for example, to provide an enhanced impedance match, for example, at an interface between a radome 2321 and a vehicle bumper fascia 2311.

In some demonstrative aspects, a depth of the cavities 2317 and/or the perforated holes 2327 may be configured, for example, to serve as a quarter wavelength transformer, for example, to reduce reflections from the vehicle bumper fascia 2311.

Figure 24:
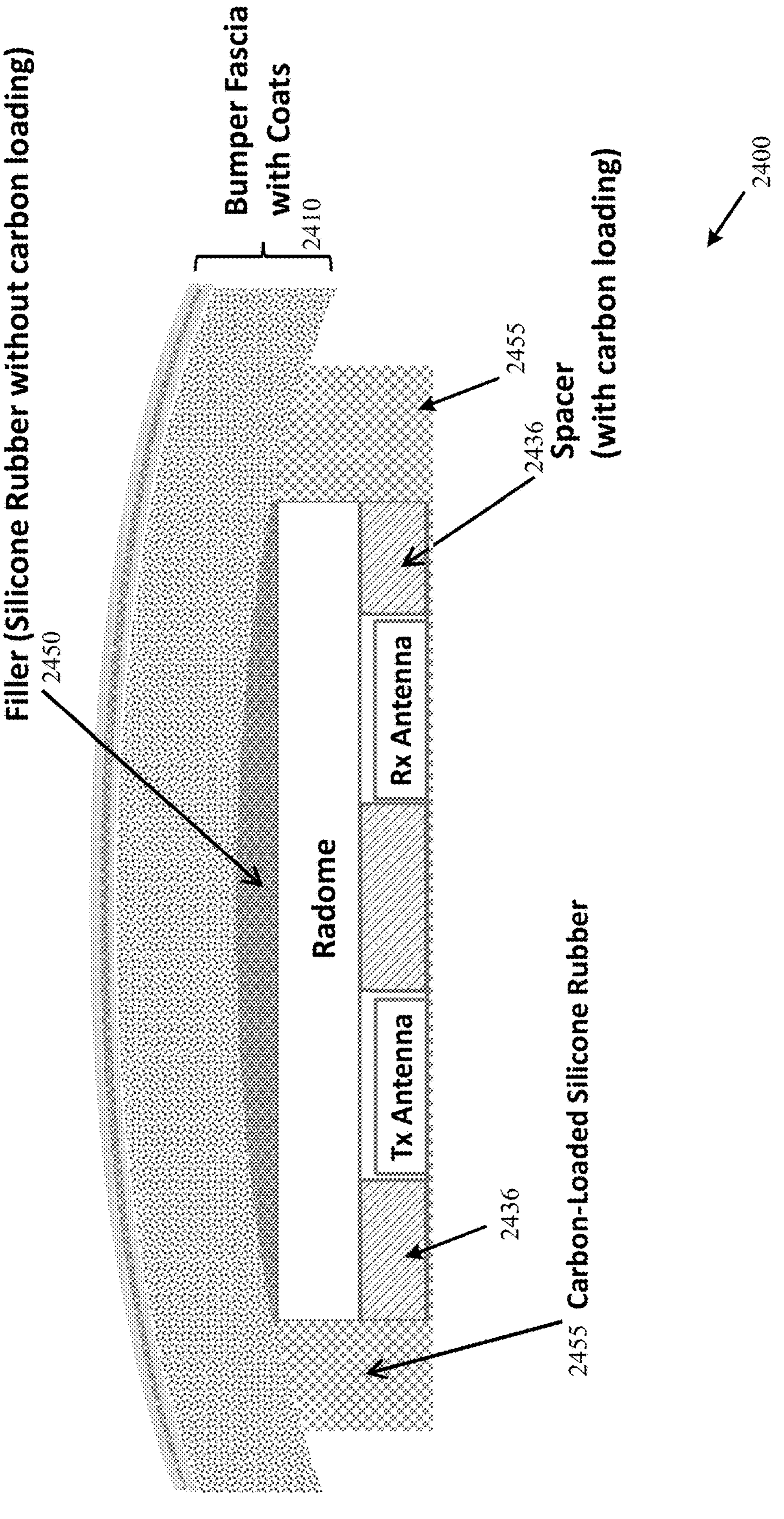
FIG. 24 is a schematic cross sectional illustration of a system, in accordance with some demonstrative aspects.

Reference is made to FIG. 24, which schematically illustrates a cross sectional view of a system 2400, in accordance with some demonstrative aspects. For example, system 2400 may include one or more elements of system 1400 (FIG. 14), and/or may perform one or more operations and/or functionalities of system 1400 (FIG. 14).

In some demonstrative aspects, as shown in FIG. 24, system 2400 may include a filler layer 2450 between a radome and a bumper fascia 2410.

In some demonstrative aspects, filler layer 2450 may include, or may be formed of, a silicone rubber.

In one example, filler layer 2450 may be made of an elastic and/or conformal material to absorb mechanical vibrations. According to this example, the silicone rubber may be a good candidate for filler layer 2450, for example, as it has a low dielectric constant and a low loss-tangent. In addition, the silicone rubber is conformable, and/or naturally hermetic.

In some demonstrative aspects, as shown in FIG. 24, a lossy filler layer 2455, for example, including silicon rubber loaded with carbon or any other material, may be implemented, for example, around an absorbing spacer 2436, e.g., in an area not in front of an antenna array. For example, lossy filler layer 2455 may be configured to limit an electromagnetically active region of a volume surrounding the antenna array.

Referring back to FIG. 22, in some demonstrative aspects, the radome 2210 may include a first radome covering the Tx antenna 2232, and a second radome covering the Rx antenna 2234, e.g., as described below.

In some demonstrative aspects, the filler layer 2250 may include a first area over the antenna array 2230, and a second area over the absorbing spacer 2236, e.g., as described below.

In some demonstrative aspects, the first area of the filler layer 2250 may have a first loss tangent, and/or the second area of the filler layer 2250 may have a second loss tangent. For example, the second loss tangent may be greater than the first loss tangent, e.g., as described below.

Figure 25:
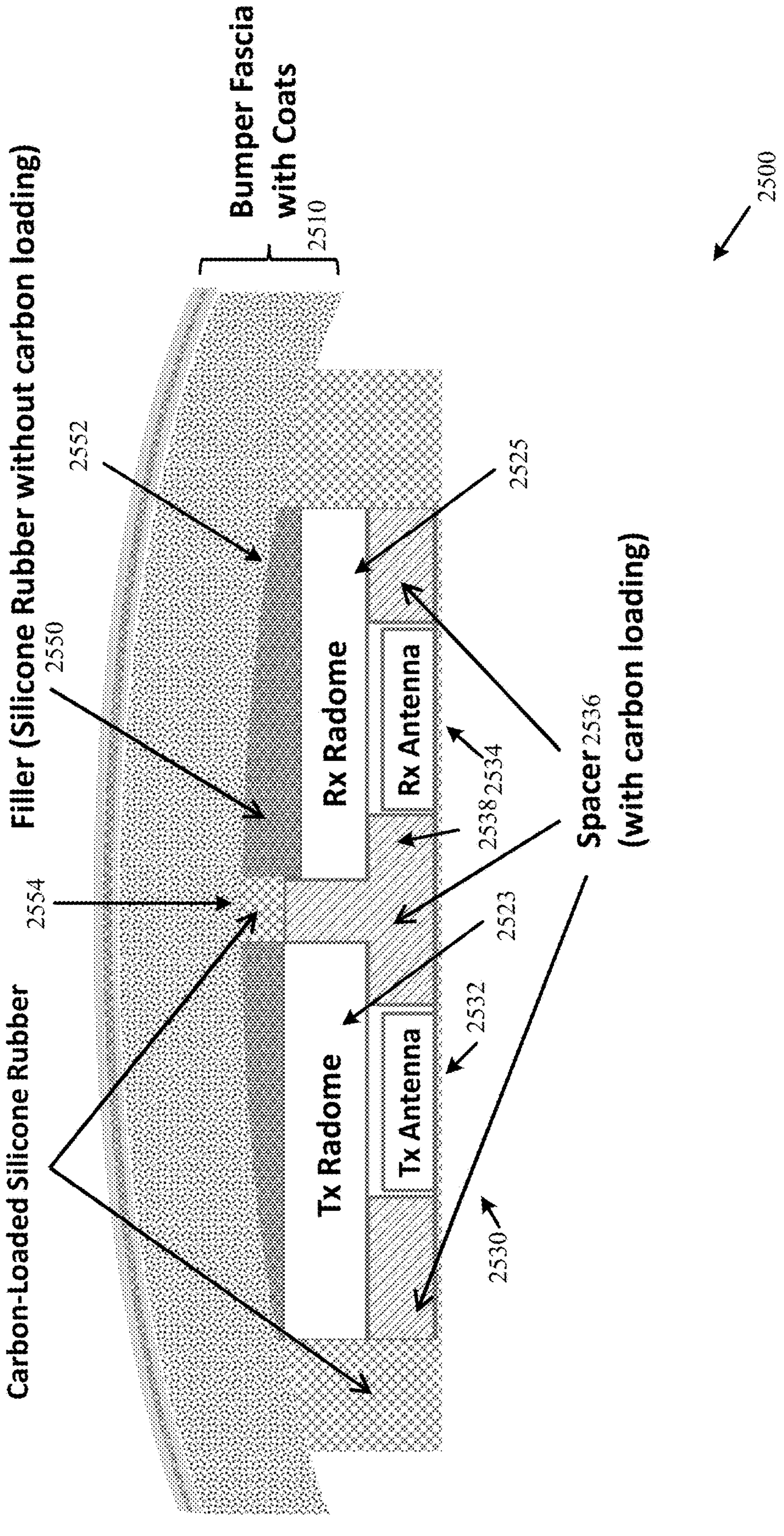
FIG. 25 is a schematic cross sectional illustration of a system, in accordance with some demonstrative aspects.

Reference is made to FIG. 25, which schematically illustrates a cross sectional view of a system 2500, in accordance with some demonstrative aspects. For example, system 2500 may include one or more elements of system 1400 (FIG. 14), and/or may perform one or more operations and/or functionalities of system 1400 (FIG. 14).

In some demonstrative aspects, as shown in FIG. 25, system 2500 may include a vehicle bumper fascia 2510, an absorbing spacer 2536, and an antenna array 2530, e.g., including a Tx antenna 2532, and an Rx antenna 2534.

In some demonstrative aspects, as shown in FIG. 25, system 2500 may include a first radome 2523 ("Tx radome") covering the Tx antenna 2532.

In some demonstrative aspects, as shown in FIG. 25, system 2500 may include a second radome 2525 ("Rx radome") covering the Rx antenna 2534.

In one example, Tx antenna 2532 and Rx antenna 2534 may have different types of designs, for example, to improve side-lobe-suppression performance. A two-way radiation pattern, which may multiply a Tx antenna pattern of the Tx antenna 2532 by an Rx antenna pattern of Tx antenna 2534, may have a lower side-lobe level. This lower side-lobe level may be used to mitigate detection ambiguity, e.g., for closely-located targets.

In some demonstrative aspects, two separate radomes may be implemented, Tx radome 2523 for Tx antenna 2532, and Rx radome 2525 for Rx antenna 2532, for example, instead of a uniform single radome for both Tx antenna 2532 and Rx antenna 2534. In other demonstrative aspects, Tx radome 2523 or Rx radome 2525 may be formed by bumper fascia 2510, spacer 2536, filler layer 2550 (or areas related to Tx or Rx), or filler layer 2554, or any combination thereof.

In some demonstrative aspects, as shown in FIG. 25, system 2500 may include a filler layer 2550 under vehicle bumper fascia 2510.

In some demonstrative aspects, the filler layer 2550 may include a first area 2552, e.g., over the antenna array 2530.

In some demonstrative aspects, the filler layer 2550 may include a second area 2554, e.g., over the absorbing spacer 2236.

In some demonstrative aspects, the first area 2552 of the filler layer 2550 may have a first loss tangent.

In some demonstrative aspects, the second area 2554 of the filler layer 2550 may have a second loss tangent.

In some demonstrative aspects, the second loss tangent may be greater than the first loss tangent, e.g., as described below.

In some demonstrative aspects, second area 2554 may include a relatively "center filler", e.g., a carbon-loaded filler.

In some demonstrative aspects, as shown in FIG. 25, a center spacer 2538 between Tx antenna 2532 and Rx antenna 2534 may have a separate radome thickness, e.g., different from a spacer thickness of other portions of the spacer 2536, e.g., on the sides of antennas 2532 and/or 2534.

In some demonstrative aspects, center spacer 2538 between Tx antenna 2532 and Rx antenna 2534 may be configured, for example, to increase a Tx-Rx isolation level between Tx antenna 2532 and Rx antenna 2534.

Referring back to FIG. 14, in some demonstrative aspects, system 1400 may include a polarization filter between the radome 1420 and the vehicle bumper fascia 1410, e.g., as described below.

In some demonstrative aspects, the polarization filter may allow signals of a first polarization to pass from the radome 1420 to the vehicle bumper fascia 1410 and to reflect signals of a second polarization, e.g., as described below.

In some demonstrative aspects, the first polarization may be based on a polarization of the Tx radar signals transmitted by Tx antenna 1432, e.g., as described below.

In some demonstrative aspects, the absorbing spacer 1436 may include a polarization rotator to rotate a polarization of reflected signals formed by reflection of the Tx radar signals from the vehicle bumper fascia 1410, e.g., to the second polarization, e.g., as described below.

Figure 26:
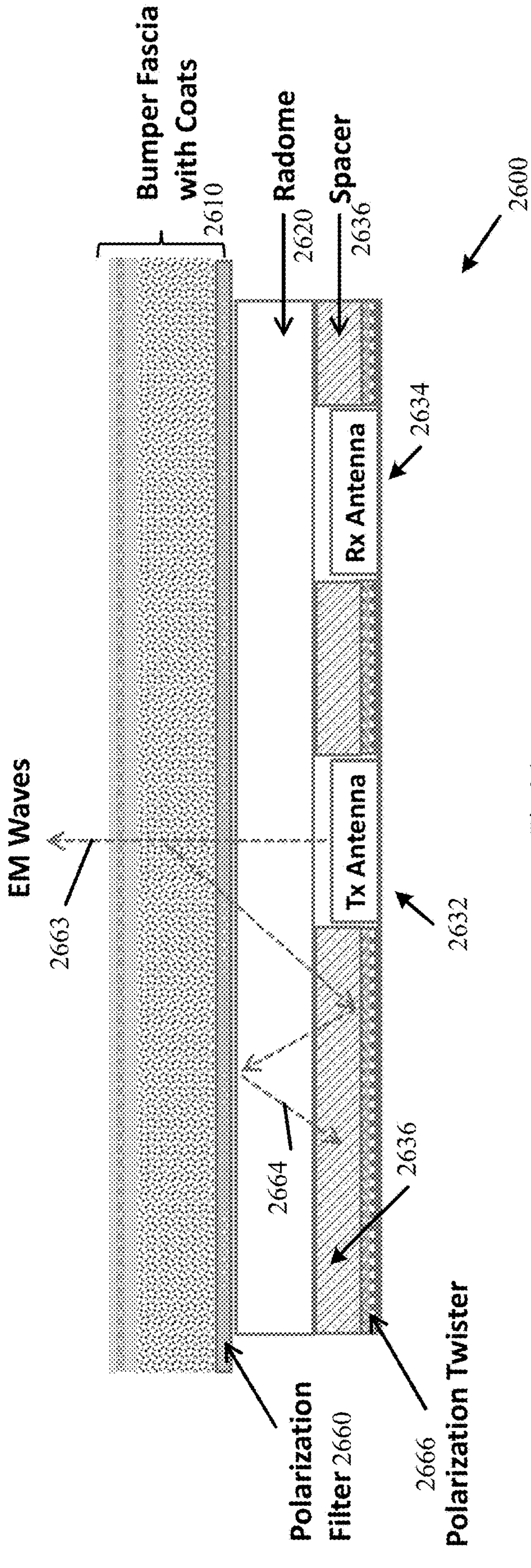
FIG. 26 is a schematic cross sectional illustration of a system, in accordance with some demonstrative aspects.

Reference is made to FIG. 26, which schematically illustrates a cross sectional view of a system 2600, in accordance with some demonstrative aspects. For example, system 2600 may include one or more elements of system 1400 (FIG. 14), and/or may perform one or more operations and/or functionalities of system 1400 (FIG. 14).

In some demonstrative aspects, as shown in FIG. 26, system 2600 may include a vehicle bumper fascia 2610, a radome 2620, an absorbing spacer 2636, and an antenna array, e.g., including a Tx antenna 2632 and an Rx antenna 2634.

In some demonstrative aspects, as shown in FIG. 26, system 2600 may include a polarization filter 2660 between the radome 2620 and the vehicle bumper fascia 2610, e.g., as described below.

In some demonstrative aspects, the polarization filter 2660 may be configured to allow signals 2663 of a first polarization to pass from the radome 2620 to the vehicle bumper fascia 2610, and to reflect signals 2664 of a second polarization.

In some demonstrative aspects, the first polarization may be based on a polarization of the Tx radar signals transmitted by the Tx antenna 2632.

In some demonstrative aspects, the absorbing spacer 2636 may include a polarization rotator/twister 2666, which may be configured to rotate a polarization of reflected signals formed by reflection of the Tx radar signals from the vehicle bumper fascia 1610, for example, to the second polarization, e.g., as described below.

Figure 27:
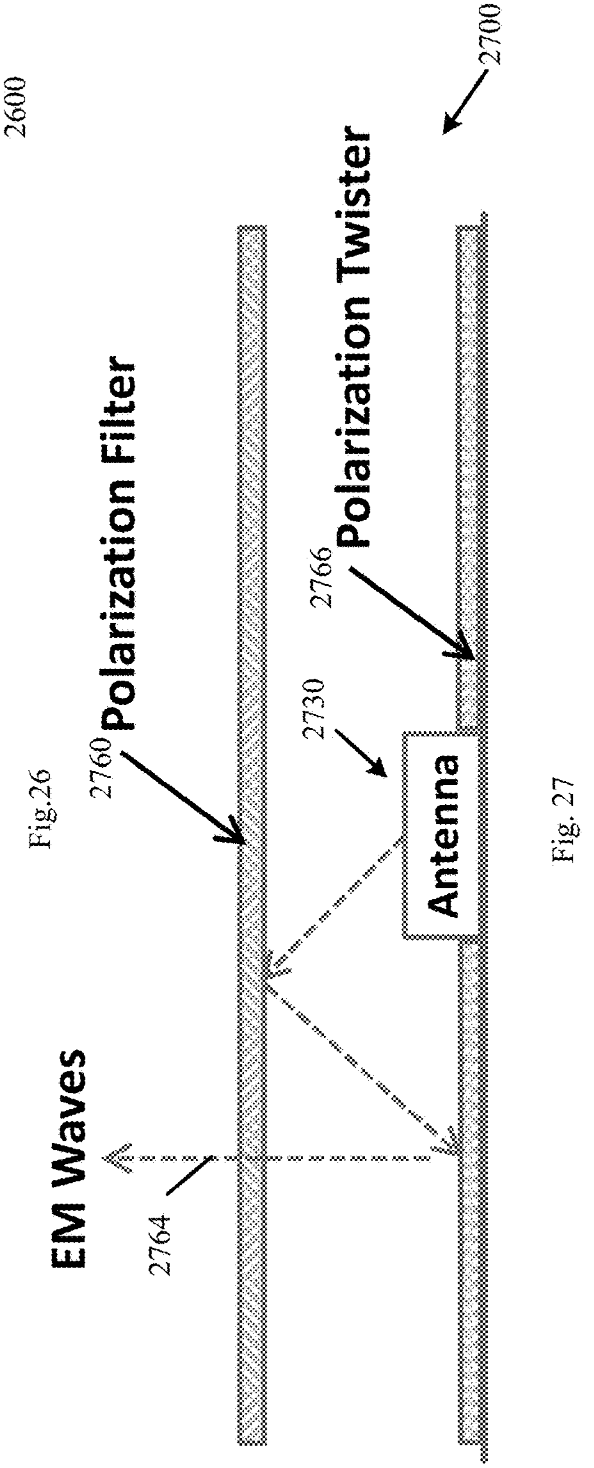
FIG. 27 is a schematic illustration of a folded reflector array structure to demonstrate a mechanism, which may be implemented in accordance with some demonstrative aspects.

Reference is made to FIG. 27, which schematically illustrates a folded reflector array structure 2700 to illustrate a mechanism, which may be implemented in accordance with some demonstrative aspects.

As shown in FIG. 27, folded reflector array structure 2700 may include a folded reflector antenna 2730, a polarization filter 2760, and a polarization rotator/twister 2766, e.g., which may be implemented with periodic structures.

In one example, the periodic or quasi-periodic structures may be printed on dielectric substrate layers, or in any other form.

In one example, the periodic or quasi-periodic structures may be configured to control reflection, transmission, and/or polarization properties of electromagnetic waves.

In some demonstrative aspects, as shown in FIG. 27, transmitted signals 2764 may be reflected by the polarization filter 2760, for example, due to a polarization mismatch, and then the polarization of the reflected signals may be rotated by polarization rotator/twister 2766, e.g., to allow the transmitted signals 2764 to pass through polarization filter 2760.

Referring back to FIG. 26, in some demonstrative aspects, at least some, e.g., a majority of, radiating electromagnetic waves from Tx antenna 2632, e.g., signals 2663, may pass through the polarization filter 2660. This configuration may be different from the configuration of folded reflector antenna structure 2700 (FIG. 27). For example, the polarization filter 2660 may be designed to match a polarization of the Tx antenna array 2632.

In some demonstrative aspects, as shown in FIG. 26, some waves, e.g., signals 2664, may be reflected by vehicle bumper fascia 2610, for example, due to an impedance mismatch from bumper fascia layers of vehicle bumper fascia 2610.

In some demonstrative aspects, as shown in FIG. 26, polarization of these reflected waves 2664 may be damped at carbon-loaded spacer 2636, twisted/rotated at the polarization twister 2666, damped again at the carbon-loaded spacer 2636, reflected again at the polarization filter 2660, for example, due to polarization mis-match, and damped again at the carbon-loaded spacer 2636. As a result of this repeated reflect/damp sequence, it is expected that a majority of the reflected waves may be decayed.

In one example, the polarization filter 2660 and/or polarization rotator/twister 2666 may be reconfigurable, for example, using diodes, phase-changing materials, and/or any other mechanisms. For example, the polarization filter 2660 and/or polarization rotator/twister 2666 may be reconfigurable to control the reflections and/or polarization rotations dynamically, for example, based on a polarization setting of signals to be transmitted by Tx antenna 2632 and/or signals to be received by Rx antenna 2634.

In some demonstrative aspects, the polarization filter 2660 and/or polarization rotator/twister 2666 may be applied to any system including an antenna array, e.g., system 1400 (FIG. 14), system 2100 (FIG. 21), system 2200 (FIG. 22), system 2300 (FIG. 17), and/or system 2400 (FIG. 18).

Figure 28:
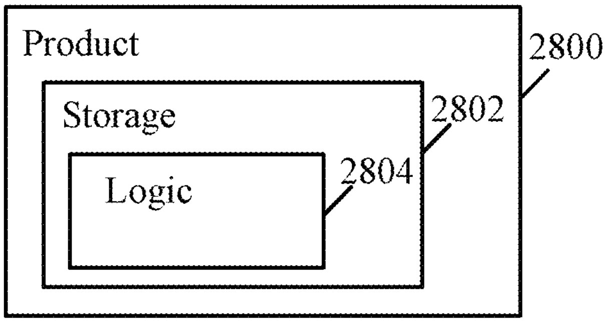
FIG. 28 is a schematic illustration of a product of manufacture, in accordance with some demonstrative aspects.

Reference is made to FIG. 28, which schematically illustrates a product of manufacture 2800, in accordance with some demonstrative aspects. Product 2800 may include one or more tangible computer-readable ("machine-readable") non-transitory storage media 2802, which may include computer-executable instructions, e.g., implemented by logic 2804, operable to, when executed by at least one computer processor, enable the at least one computer processor to implement one or more operations and/or functionalities described with reference to the FIGS. 1-27, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 2800 and/or storage media 2802 may include one or more types of computer-readable storage media capable of storing data, including volatile memory, non-volatile memory, removable or non-removable memory, erasable or non-erasable memory, writeable or re-writeable memory, and the like. For example, storage media 2802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 2804 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 2804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes a radar apparatus comprising a radome; an antenna array on a Printed Circuit Board (PCB), the antenna array is between the PCB and the radome, the antenna array comprising a Transmit (Tx) antenna configured to transmit Tx radar signals via the radome and a vehicle bumper-fascia, and a receive (Rx) antenna configured to receive Rx radar signals based on the Tx radar signals; and an absorbing spacer in a spacer area between the PCB and the radome, the spacer area separating the Tx antenna from the Rx antenna, the absorbing spacer configured to absorb reflected signals formed by reflection of the Tx radar signals from the vehicle bumper fascia.

Example 2 includes the subject matter of Example 1, and optionally, wherein at least part of a surface of the radome is directly in touch with a surface of the vehicle bumper fascia.

Example 3 includes the subject matter of Example 1 or 2, and optionally, wherein a distance between the surface of the radome and the surface of the vehicle bumper fascia is less than 50 millimeter.

Example 4 includes the subject matter of any one of Examples 1-3, and optionally, wherein a distance between the surface of the radome and the surface of the vehicle bumper fascia is less than 20 millimeter.

Example 5 includes the subject matter of any one of Examples 1-4, and optionally, wherein a distance between the surface of the radome and the surface of the vehicle bumper fascia is less than 5 millimeter.

Example 6 includes the subject matter of any one of Examples 1-5, and optionally, wherein a distance between the surface of the radome and the surface of the vehicle bumper fascia is less than 3 millimeter.

Example 7 includes the subject matter of any one of Examples 1-6, and optionally, wherein a distance between the surface of the radome and the surface of the vehicle bumper fascia is less than 2 millimeter.

Example 8 includes the subject matter of any one of Examples 1-7, and optionally, wherein a distance between the surface of the radome and the surface of the vehicle bumper fascia is less than 1 millimeter.

Example 9 includes the subject matter of any one of Examples 1-8, and optionally, wherein distance between the surface of the radome and the surface of the vehicle bumper fascia is 0.1 millimeter or less.

Example 10 includes the subject matter of any one of Examples 1-9, and optionally, comprising a filler layer between the radome and the vehicle bumper fascia.

Example 11 includes the subject matter of Example 10, and optionally, wherein the filler layer fills an area between a curved surface of the vehicle bumper fascia and a surface of the radome.

Example 12 includes the subject matter of Example 10 or 11, and optionally, wherein the filler layer comprises a rigid elastomeric material.

Example 13 includes the subject matter of any one of Examples 10-12, and optionally, wherein the filler layer comprises silicone rubber.

Example 14 includes the subject matter of any one of Examples 10-13, and optionally, wherein the filler layer comprises a first area over the antenna array and a second area over the absorbing spacer, wherein the first area of the filler layer has a first loss tangent, and the second area of the filler layer has a second loss tangent, the second loss tangent is greater than the first loss tangent.

Example 15 includes the subject matter of any one of Examples 10-14, and optionally, wherein the filler layer comprises a carbon-loaded area over at least part of the absorbing spacer.

Example 16 includes the subject matter of any one of Examples 10-15, and optionally, wherein the filler layer has a loss tangent of 0.01 or less in an area over the antenna array.

Example 17 includes the subject matter of any one of Examples 10-16, and optionally, wherein the filler layer has a dielectric constant of 100 or less.

Example 18 includes the subject matter of any one of Examples 10-17, and optionally, wherein the filler layer has a dielectric constant of 20 or less.

Example 19 includes the subject matter of any one of Examples 10-18, and optionally, wherein the filler layer has a dielectric constant of 12 or less.

Example 20 includes the subject matter of any one of Examples 10-19, and optionally, wherein the filler layer comprises a plurality of cavities (perforated holes).

Example 21 includes the subject matter of any one of Examples 1-20, and optionally, comprising a polarization filter between the radome and the vehicle bumper fascia, the polarization filter to allow signals of a first polarization to pass from the radome to the vehicle bumper fascia and to reflect signals of a second polarization, wherein the first polarization is based on a polarization of the Tx radar signals, wherein the absorbing spacer comprises a polarization rotator to rotate a polarization of the reflected signals to the second polarization.

Example 22 includes the subject matter of any one of Examples 1-21, and optionally, wherein the spacer area surrounds the Tx antenna, and wherein the spacer area surrounds the Rx antenna.

Example 23 includes the subject matter of any one of Examples 1-22, and optionally, wherein the absorbing spacer comprises carbon loaded plastic.

Example 24 includes the subject matter of Example 23, and optionally, wherein a volume resistivity of the carbon loaded plastic is between 5 Ohm-centimeter (Ohm*cm) and 10 Ohm*cm.

Example 25 includes the subject matter of any one of Examples 1-24, and optionally, comprising an impedance-matching layer between the radome and the vehicle bumper fascia, the impedance-matching layer configured to reduce an impedance difference between the radome and the vehicle bumper fascia.

Example 26 includes the subject matter of any one of Examples 1-25, and optionally, comprising an integrated radome-spacer formed by a plastic layer, wherein the absorbing spacer comprises a carbon-loaded part of the plastic layer.

Example 27 includes the subject matter of any one of Examples 1-26, and optionally, wherein the radome comprises a first radome covering the Tx antenna, and a second radome covering the Rx antenna.

Example 28 includes the subject matter of any one of Examples 1-27, and optionally, comprising a radar processor configured to generate radar information based on the Rx radar signals.

Example 29 includes the subject matter of Example 28, and optionally, comprising a vehicle, the vehicle comprising a system controller to control one or more systems of the vehicle based on the radar information.

Example 30 includes a radar device comprising the apparatus of one or more of Examples 1-29.

Example 31 includes a vehicle comprising the apparatus of one or more of Examples 1-29.

Example 32 includes an apparatus comprising means for executing any of the described operations of one or more of Examples 1-29.

Example 33 includes a machine-readable medium that stores instructions for execution by a processor to perform any of the described operations of one or more of Examples 1-29.

Example 34 includes an apparatus comprising a memory; and processing circuitry configured to perform any of the described operations of one or more of Examples 1-29.

Example 35 includes a method including any of the described operations of one or more of Examples 1-29.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A radar apparatus comprising:

a radome;

an antenna array on a Printed Circuit Board (PCB), the antenna array is between the PCB and the radome, the antenna array comprising a Transmit (Tx) antenna configured to transmit Tx radar signals via the radome and a vehicle bumper fascia, and a receive (Rx) antenna configured to receive Rx radar signals based on the Tx radar signals; and an absorbing spacer in a spacer area between the PCB and the radome, the spacer area separating the Tx antenna from the Rx antenna, the spacer area surrounds the Tx antenna, the spacer area surrounds the Rx antenna, wherein the absorbing spacer is configured to absorb reflected signals formed by reflection of the Tx radar signals from the vehicle bumper fascia, wherein the absorbing spacer and the radome are integrated by an integrated radome-spacer formed by a plastic layer, wherein the absorbing spacer comprises a carbon-loaded part of the plastic layer.

2. The radar apparatus of claim 1, wherein at least part of a surface of the radome is directly in touch with a surface of the vehicle bumper fascia.

3. The radar apparatus of claim 1, wherein a distance between a surface of the radome and a surface of the vehicle bumper fascia is less than 50 millimeter.

4. The radar apparatus of claim 1, wherein a distance between a surface of the radome and a surface of the vehicle bumper fascia is less than 5 millimeter.

5. The radar apparatus of claim 1, wherein a distance between a surface of the radome and a surface of the vehicle bumper fascia is less than 1 millimeter.

6. The radar apparatus of claim 1, wherein a distance between a surface of the radome and a surface of the vehicle bumper fascia is 0.1 millimeter or less.

7. The radar apparatus of claim 1 comprising a filler layer between the radome and the vehicle bumper fascia.

8. The radar apparatus of claim 7, wherein the filler layer fills an area between a curved surface of the vehicle bumper fascia and a surface of the radome.

9. The radar apparatus of claim 7, wherein the filler layer comprises a rigid elastomeric material.

10. The radar apparatus of claim 7, wherein the filler layer comprises silicone rubber.

11. The radar apparatus of claim 7, wherein the filler layer comprises a first area over the antenna array and a second area over the absorbing spacer, wherein the first area of the filler layer has a first loss tangent, and the second area of the filler layer has a second loss tangent, the second loss tangent is greater than the first loss tangent.

12. The radar apparatus of claim 7, wherein the filler layer comprises a carbon-loaded area over at least part of the absorbing spacer.

13. The radar apparatus of claim 7, wherein the filler layer has a loss tangent of 0.01 or less in an area over the antenna array.

14. The radar apparatus of claim 7, wherein the filler layer has a dielectric constant of 20 or less.

15. The radar apparatus of claim 7, wherein the filler layer comprises a plurality of cavities.

16. The radar apparatus of claim 1 comprising a polarization filter between the radome and the vehicle bumper fascia, the polarization filter to allow signals of a first polarization to pass from the radome to the vehicle bumper fascia and to reflect signals of a second polarization, wherein the first polarization is based on a polarization of the Tx radar signals, wherein the absorbing spacer comprises a polarization rotator to rotate a polarization of the reflected signals to the second polarization.

17. The radar apparatus of claim 1, wherein a volume resistivity of the carbon-loaded part of the plastic layer is between 5 Ohm-centimeter (Ohm*cm) and 10 Ohm*cm.

18. The radar apparatus of claim 1 comprising an impedance-matching layer between the radome and the vehicle bumper fascia, the impedance-matching layer configured to reduce an impedance difference between the radome and the vehicle bumper fascia.

19. The radar apparatus of claim 1, wherein the radome comprises a first radome covering the Tx antenna, and a second radome covering the Rx antenna.

20. The radar apparatus of claim 1 comprising a radar processor configured to generate radar information based on the Rx radar signals.

21. A vehicle comprising:

a system controller configured to control one or more vehicular systems of the vehicle based on radar information; and a radar device configured to provide the radar information to the system controller, the radar device comprising:

a radome;

an antenna array on a Printed Circuit Board (PCB), the antenna array is between the PCB and the radome, the antenna array comprising a Transmit (Tx) antenna configured to transmit Tx radar signals via the radome and a bumper fascia of the vehicle, and a receive (Rx) antenna configured to receive Rx radar signals based on the Tx radar signals; and an absorbing spacer in a spacer area between the PCB and the radome, the spacer area separating the Tx antenna from the Rx antenna, the spacer area surrounds the Tx antenna, the spacer area surrounds the Rx antenna, wherein the absorbing spacer is configured to absorb reflected signals formed by reflection of the Tx radar signals from the bumper fascia, wherein the absorbing spacer and the radome are integrated by an integrated radome-spacer formed by a plastic layer, wherein the absorbing spacer comprises a carbon-loaded part of the plastic layer; and a processor configured to generate the radar information based on input radar data, the input radar data based on the Rx radar signals.

22. The vehicle of claim 21, wherein at least part of a surface of the radome is directly in touch with a surface of the bumper fascia.

23. The vehicle of claim 21 comprising a filler layer between the radome and the bumper fascia.

* * * * *